(12) United States Patent
Taniguchi et al.

(10) Patent No.: US 9,901,878 B2
(45) Date of Patent: Feb. 27, 2018

(54) MEMBRANE SEPARATION DEVICE AND OPERATION METHOD FOR MEMBRANE SEPARATION DEVICE

(71) Applicant: TORAY INDUSTRIES, INC., Tokyo (JP)

(72) Inventors: Masahide Taniguchi, Otsu (JP); Kazunori Tomioka, Otsu (JP); Tomohiro Maeda, Otsu (JP)

(73) Assignee: Toray Industries, Inc., Chuo-Ku, Tokyo (JP)

( * ) Notice: Subject to any disclaimer, the term of this patent is extended or adjusted under 35 U.S.C. 154(b) by 220 days.

(21) Appl. No.: 14/402,157

(22) PCT Filed: May 21, 2013

(86) PCT No.: PCT/JP2013/064057
§ 371 (c)(1),
(2) Date: Nov. 19, 2014

(87) PCT Pub. No.: WO2013/176119
PCT Pub. Date: Nov. 28, 2013

(65) Prior Publication Data
US 2015/0144559 A1 May 28, 2015

(30) Foreign Application Priority Data
May 22, 2012 (JP) ................................ 2012-116802

(51) Int. Cl.
*B01D 63/10* (2006.01)
*B01D 63/12* (2006.01)
*B01D 65/08* (2006.01)

(52) U.S. Cl.
CPC .......... *B01D 63/106* (2013.01); *B01D 63/12* (2013.01); *B01D 65/08* (2013.01);
(Continued)

(58) Field of Classification Search
CPC ...... B01D 63/10; B01D 63/12; B01D 63/106; B01D 61/02; B01D 61/022; B01D 61/12;
(Continued)

(56) References Cited

U.S. PATENT DOCUMENTS 7,338,601 B2 * 3/2008 Schott ................. B01D 53/225
210/232
2008/0230476 A1 * 9/2008 Gilron .................... B01D 61/02
210/652

FOREIGN PATENT DOCUMENTS

CA WO2012019273 * 2/2012
JP 0679142 3/1994
(Continued)

OTHER PUBLICATIONS

English language machine translation of JP2008161797, No Date, 19 Pages.*
(Continued)

*Primary Examiner* — Pranav Patel
(74) *Attorney, Agent, or Firm* — RatnerPrestia

(57) ABSTRACT

A membrane separation device includes a separation membrane unit A that has a separation membrane unit component 8, feed stream side lines F1 and F2, and a permeate stream line P, and a unit for feeding a stream-to-be-treated, wherein a stream-to-be-treated sealing material is provided in the perimeter of an anti-telescoping plate of the separation membrane element, wherein the separation membrane elements can be moved within a cylindrical pressure vessel substantially in either direction, wherein the separation membrane unit is configured to feed the stream-to-be-treated through one of the feed stream side lines F1 and F2 and to discharge the concentrate stream through the other of the
(Continued)

feed stream side lines, and wherein the separation membrane unit includes a mechanism that can switch the flow between the feed stream side lines.

7 Claims, 18 Drawing Sheets

(52) U.S. Cl.
CPC ...... *B01D 2313/04* (2013.01); *B01D 2313/18* (2013.01); *B01D 2317/022* (2013.01); *B01D 2317/025* (2013.01); *B01D 2321/2083* (2013.01); *B01D 2321/40* (2013.01)

(58) Field of Classification Search
CPC ...... B01D 61/58; B01D 61/142; B01D 29/17; B01D 29/216; B01D 29/54; B01D 2317/04; B01D 2317/06; B01D 2317/022; B01D 2313/083; B01D 2313/06; B01D 2313/20; B01D 2319/022; B01D 2319/04; C02F 1/441; C02F 1/442; C02F 1/444; C02F 2103/08; C02F 2301/04; C02F 2301/043; C02F 2301/08
See application file for complete search history.

(56) References Cited

FOREIGN PATENT DOCUMENTS

| | | | |
|---|---|---|---|
| JP | 2000288356 | * | 10/2000 |
| JP | 2002210335 | | 7/2002 |
| JP | 2004141846 | | 5/2004 |
| JP | 2004261724 | | 9/2004 |
| WO | 2004022206 A1 | | 3/2004 |
| WO | 2005053824 A2 | | 6/2005 |
| WO | 2006137068 A2 | | 12/2006 |
| WO | 2009128328 | | 10/2009 |
| WO | 2011046944 | | 4/2011 |

OTHER PUBLICATIONS

English language machine translation of JP2000288356, No Date, 15 Pages.*

International Search Report for International Application No. PCT/JP2013/064057 dated Jul. 9, 2013.

\* cited by examiner

MEMBRANE SEPARATION DEVICE AND OPERATION METHOD FOR MEMBRANE SEPARATION DEVICE

CROSS REFERENCE TO RELATED APPLICATIONS

This is the U.S. National Phase application of PCT/JP2013/064057, filed May 21, 2013, which claims priority to Japanese Patent Application No. 2012-116802, filed May 22, 2012, the disclosures of each of these applications being incorporated herein by reference in their entireties for all purposes.

FIELD OF THE INVENTION

The present invention relates to a membrane separation device with a separation membrane unit that includes a separation membrane module including a plurality of spiral-wound membrane elements for separating and removing a substance present in a stream-to-be-treated, and a method for operating such device.

BACKGROUND OF THE INVENTION

In recent years, fluid separation technologies using various separation membranes such as a gas separation membrane, a reverse osmosis membrane, a nanofiltration membrane, an ultrafiltration membrane, a microfiltration membrane, and the like have received attention as a fine and energy saving process, and the application of such technologies to treatment of various fluids has been promoted. For example, in a reverse osmosis separation process using a reverse osmosis membrane, a solution containing a solute such as salt is allowed to permeate the reverse osmosis membrane at a pressure above the osmotic pressure of the solution, thereby yielding a liquid that has a reduced concentration of the solute such as salt. For example, the process is widely applied for desalination of seawater and brine water, production of ultrapure water, concentration and recovery of a valuable material, and the like.

For efficient operation of such separation membrane, contamination of the membrane surface, which is called fouling, is the most significant problem. This is a process in which impurities contained in a stream-to-be-treated deposit or adsorb onto a membrane surface and a separation membrane channel, thereby degrading the performance of the separation membrane. To prevent the fouling, measures are applied, including pretreatment by filtration and the like to preliminarily remove the impurities, and generation of turbulence in separation membrane module channels to reduce the tendency to deposit the impurities. When a membrane is contaminated despite such measures, a method for rejuvenating the membrane such as washing the membrane with chemicals is applied. However, if the pretreatment is insufficient and/or a large amount of impurities are contained, penetration of materials that cause fouling into the separation membrane is often not prevented. If possible, it is preferred not to wash a membrane with chemicals, because, for example, the washing process usually requires shutdown and the cost of the chemicals, as well as the chemicals degrade separation membranes. Thus, procedures called physical washing are often applied before the need for washing with chemicals, the procedures including a flushing process in which raw-water-to-be-treated or permeate water is fed at the raw water side of a membrane at a high flux, a backwashing process in which pressure is applied onto the permeate side of a membrane to move the permeate water backward toward the raw water side of the membrane to float and remove deposited foulants.

A separation membrane has various configurations such as flat sheet, tubular, and hollow fiber configurations. In the case of a flat sheet membrane, the membrane is often used in the form of a spiral-wound membrane element. As illustrated in Patent Document 1, for example, a conventional spiral-wound membrane element includes one or more laminates of a separation membrane with sealed edges to ensure that a feed stream and a permeate stream do not mix with each other, a feed side channel spacer, and a permeate side channel spacer, the laminates being wound in a spiral around a perforated center tube, and an anti-telescoping plate attached to both ends of the wound laminates.

In such separation membrane element, a stream-to-be-treated is fed at one of the end surfaces and then flows along the feed side channel spacer to pass part of the ingredients (for example, water in the case of desalination of seawater) through the separation membrane, thereby separating the stream-to-be-treated. Then, the ingredient that has passed through the separation membrane (permeate water) flows along the permeate side channel spacer into the center tube through holes in a side of the tube, and then passes through the center tube to be collected as a permeate stream. On the other hand, the treated water containing a high concentration of a non-permeate ingredient (salt in the case of desalination of seawater) is collected from the other end surface of the separation membrane element as concentrated water. Such spiral-wound membrane element has an advantage of tending to reduce channeling due to uniform distribution of channels for a stream-to-be-treated, but if pretreatment is insufficient, there is a problem of tending to deposit foulants on the end surface to which a stream-to-be-treated is fed.

Particularly, in the spiral-wound membrane element, usually one or more separation membrane elements are often disposed in series in a single pressure vessel. In this case, fouling as described above dominantly occurs in, especially, the front end region of a first separation membrane element. And, in the case of desalination of seawater, due to osmotic pressure, the first element exhibits high permeation flux, because the element receives less concentrate stream, and tends to deposit foulants on the membrane surface, thereby promoting fouling. On the other hand, as the solute is concentrated, and then osmotic pressure increases, the last separation membrane element has lower permeation flux and thus is less likely to cause fouling. On the contrary, a later separation membrane element has the property of receiving a stream-to-be-treated at a lower flow rate due to permeation through a prior element, and thus producing reduced flushing effect on the membrane surface, so foulants deposited on the membrane surface are difficult to remove from the membrane surface. To maintain the flow rate of a stream-to-be-treated, a separation device often uses a configuration in which a plurality of separation membrane unit components 8a, 8b, and 8c are organized in a tree structure, as illustrated in FIG. 18, to decrease the number of separation membrane unit components 8c in the later stage, for matching with the reduced flow rate, thereby maintaining the flow rate of the stream fed to the separation membrane unit. In FIG. 18, 7a represents a valve, 26 represents a stream-to-be-treated, 27 represents a permeate stream, and 28 represents a concentrate stream.

In view of the foregoing problems and characteristics, for example, Patent Document 1 proposes a method of periodically feeding permeate water into a concentrated water outlet to flush the permeate water in the opposite direction to the flow of a stream-to-be-treated, and Patent Document 2 proposes a method of switching the flow between forward and reverse directions on the stream-to-be-treated side for flushing. These methods allow removal of foulants depositing on the ends of a separation membrane element, and, when stream flows in the forward direction, allow removal of foulants depositing on later separation membrane elements, which tend to produce reduced flushing effect on the membrane surface. Patent Document 3 and Patent Document 5 propose a method of reversing the flow direction of a stream-to-be-treated during operation to remove foulants depositing on the surface of a separation membrane, with little downtime. As illustrated in Patent Document 4, such method is also applied to a plurality of separation membrane unit components organized in a tree structure to allow reversal of the flow direction of each stream-to-be-treated.

Although these methods are applicable to a system that has a substantially similar structure from the feed water inlet to the concentrated water outlet so that the performance does not change even when a flow direction is reversed, as in a hollow fiber membrane module, the spiral-wound membrane element as described above uses a sealing material that effectively functions only in a single flow direction when a separation membrane element is disposed in a vessel, and thus provides poor sealing when the flow direction is reversed. Although such poor sealing is acceptable in backwashing, treatment efficiency decreases due to, for example, energy loss, in an operation in which a stream-to-be-treated flows in the reverse direction for a long period.

PATENT DOCUMENTS

Patent Document 1: WO 2009/128328
Patent Document 2: Japanese Unexamined Patent Application Publication No. 2004-141846
Patent Document 3: Japanese Unexamined Patent Application Publication No. 2002-210335
Patent Document 4: Japanese Unexamined Patent Application Publication No. 2004-261724
Patent Document 5: Japanese Unexamined Patent Application Publication No. H06-79142

SUMMARY OF THE INVENTION

It is an object to allow a stream-to-be-treated to be fed to separation membrane unit components in both of forward and reverse directions for treatment; to allow the use of the separation membranes to be balanced; and to allow a membrane separation process to be efficiently carried out while effectively preventing fouling, even if a subunit is constituted by separation membrane unit components that use spiral-wound membrane elements.

To solve the problems described above, the present invention includes the following aspects (1)-(11):

(1) A membrane separation device including a unit for feeding a stream-to-be-treated, and a separation membrane unit that includes at least one separation membrane unit component including at least one separation membrane module including one or more separation membrane elements disposed in a cylindrical pressure vessel, and a feed stream side line F1, a feed stream side line F2, and a permeate stream line P that are connected to the separation membrane unit component, wherein a stream-to-be-treated fed is separated by separation membranes into a permeate stream and a concentrate stream, wherein in the separation membrane elements, a cladding is wrapped around the outer surface of a wound laminate formed by winding the separation membranes together with a channel spacer, wherein an anti-telescoping plate is attached to at least one end of the wound laminate and the cladding, wherein a stream-to-be-treated sealing material is disposed between the perimeter of at least one of the anti-telescoping plate and the inner wall of the cylindrical pressure vessel, to allow movement of the separation membrane elements substantially in either direction within the cylindrical pressure vessel, wherein when the stream-to-be-treated is fed to the separation membrane unit component through one of the feed stream side lines F1 and F2, the separation membrane unit is configured to discharge the concentrate stream from the other of the feed stream side lines, and wherein the separation membrane unit includes a mechanism that can change the flow direction so that the stream-to-be-treated is fed to the separation membrane unit component through either of the feed stream side lines F1 and F2.

(2) The membrane separation device according to (1), wherein three-way valves are used to switch the flow of the stream-to-be-treated to the separation membrane unit component, between the feed stream side line F1 and the feed stream side line F2.

(3) The membrane separation device according to (1) or (2), wherein the separation membrane unit includes at least two of the separation membrane unit components, and wherein when one or more separation membrane unit components that first treat the stream-to-be-treated are referred to as subunit (A), the separation membrane unit is configured to feed the concentrate stream discharged from the subunit (A) to a subunit (B) constituted by one or more other separation membrane unit components.

(4) The membrane separation device according to (3), wherein when the total membrane area of the subunits (A) and (B) is taken as Sa and Sb respectively, the relationship of Sa>Sb is obtained.

(5) The membrane separation device according to (1) or (2), wherein the separation membrane unit includes at least three of the separation membrane unit components, and wherein when one or more separation membrane unit components that first treat the stream-to-be-treated are referred to as subunit (A), the separation membrane unit is configured to feed the concentrate stream discharged from the subunit (A) to a subunit (B) constituted by one or more other separation membrane unit components and to further feed the concentrate stream discharged from the subunit (B) to a subunit (C) constituted by one or more still other separation membrane unit components.

(6) The membrane separation device according to (5), wherein when the total membrane area of the subunits (A), (B) and (C) is taken as Sa, Sb, and Sc respectively, the relationship of Sa>Sb≥Sc is obtained.

(7) The membrane separation device according to (3) or (4), wherein a unit configuration in which the stream-to-be-treated is fed through the feed stream side line F1 and the stream-to-be-treated is treated by the subunit (A) and then the subunit (B) is the same as a unit configuration in which the stream-to-be-treated is fed through the feed stream side line F2 and the stream-to-be-treated is treated by the subunit (B) and then the subunit (A).

(8) The membrane separation device according to (5) or (6), wherein a unit configuration in which the stream-to-be-treated is fed through the feed stream side line F1 and the stream-to-be-treated is treated by the subunit (A), then the subunit (B), and then the subunit (C) is the same as a unit configuration in which the stream-to-be-treated is fed through the feed stream side line F2 and the stream-to-be-treated is treated by the subunit (C), then the subunit (B), and then the subunit (A).

(9) The membrane separation device according to any of (3)-(8), wherein the separation membrane unit includes feed stream side lines F3 and F4, and a subunit (D) constituted by one or more still other separation membrane unit components, wherein the permeate stream discharged from at least one of the prior separation membrane unit components is fed to the subunit (D), wherein the permeate stream separated by the membranes in the subunit (D) is discharged into the permeate stream line P and the concentrate stream exits from the device, wherein the separation membrane unit is configured so that when the permeate stream is fed to the subunit (D) through one of the feed stream side lines F3 and F4, the concentrate stream is discharged from the subunit (D) through the other of the feed stream side lines, and wherein the separation membrane unit includes a mechanism that can switch the flow so that the permeate stream is fed to the subunit (D) through either of the feed stream side lines F3 and F4.

(10) A method for operating the membrane separation device according to any of (1)-(9), wherein the stream-to-be-treated is alternately fed through the feed stream side lines F1 and F2 for treatment.

(11) The method for operating a membrane separation device according to (10), wherein the method includes measuring pressure loss calculated from the differential between the pressure of a feed stream and the pressure of a concentrate stream in a single separation membrane unit component, or pressure loss calculated from the differential between the pressure of a feed stream and the pressure of a concentrate stream in a subunit that includes a plurality of separation membrane unit components disposed in series and then changing the feed direction of the stream-to-be-treated based on a change in the measurements.

In an embodiment of the present invention, a subunit is constituted by separation membrane unit components that use spiral-wound membrane elements, and a stream-to-be-treated is allowed to be fed in both of the forward and reverse directions to the separation membrane unit components for treatment, thereby allowing the use of separation membranes to be balanced and allowing a membrane separation process to be efficiently carried out while effectively preventing fouling. And the present invention can provide a membrane separation device that prevents contamination of the separation membrane unit components using spiral-wound membrane elements and that fully exploits the performance of the separation membranes while reducing maintenance time and labor, and a method for operating such device.

BRIEF DESCRIPTION OF THE DRAWINGS

FIG. 16 (a) is the plan view, and FIG. 16 (b) is the cross-sectional view taken along the line b-b in FIG. 16 (a).

DETAILED DESCRIPTION OF EMBODIMENTS OF THE INVENTION

Figure 1:
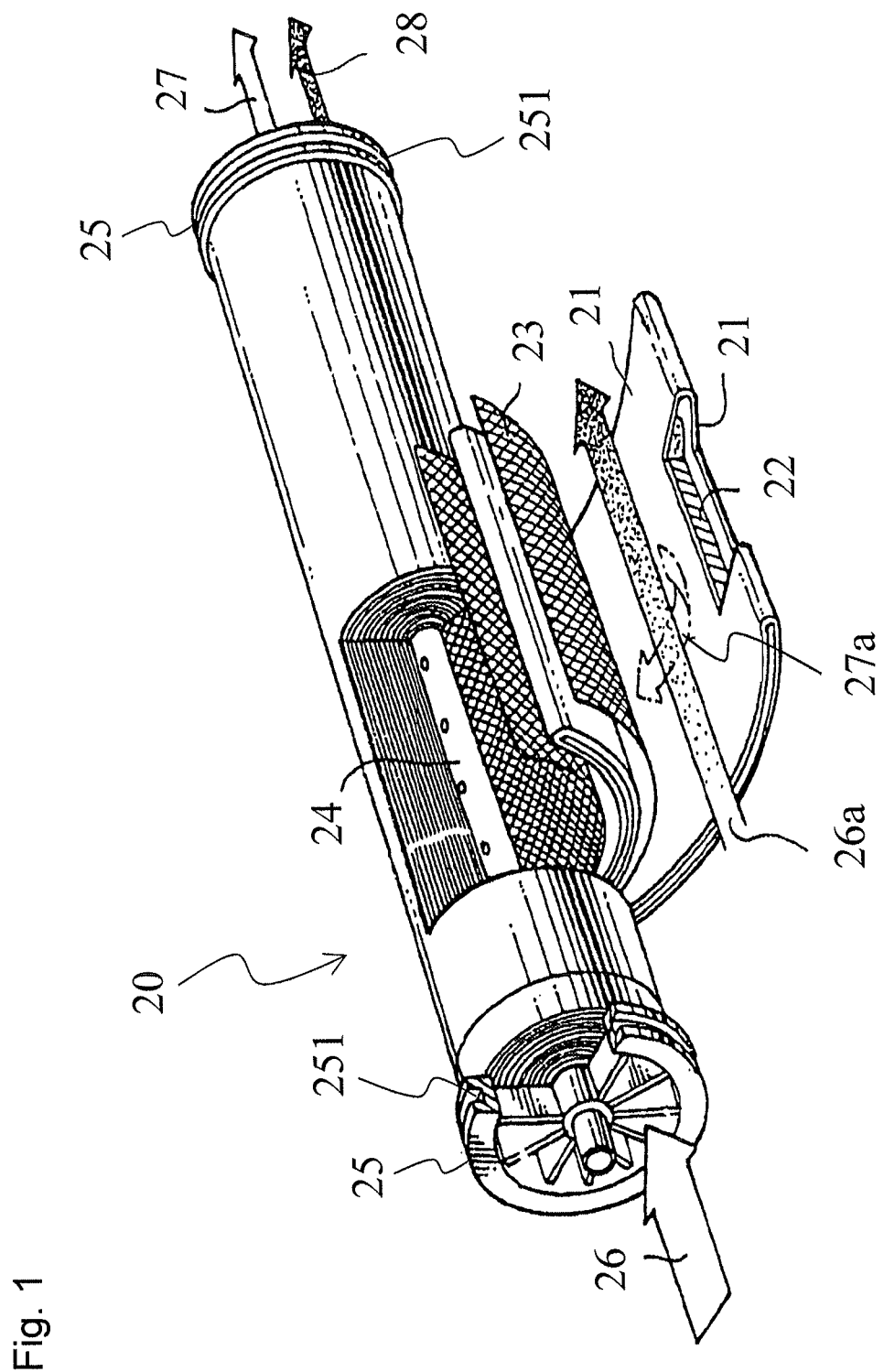
FIG. 1 is a partial cut-away perspective view of an example of an embodiment of a spiral-wound membrane element constituting the present invention.

In the present specification, a separation membrane unit includes at least one separation membrane unit component, feed stream side lines F1 and F2, and a permeate stream line P. In particular, the separation membrane unit can include one or more separation membrane unit components. When the separation membrane unit includes a plurality of separation membrane unit components, the components can be configured to be divided into a plurality of subunits. These subunits include at least one separation membrane unit component, and, as described below, the separation membrane unit component that constitutes the subunits or a combination thereof can be changed as needed, depending on the feed direction of a stream-to-be-treated. The separation membrane unit component includes at least one separation membrane module.

Now, embodiments of the present invention will be described with reference to the drawings, although the present invention is not limited to the embodiments illustrated in the drawings.

FIG. 1 is a partial cut-away perspective view of an example of an embodiment of a spiral-wound membrane element constituting the present invention.

In FIG. 1, a separation membrane element 20 includes one or more laminates of a separation membrane 21 with sealed edges to ensure that a feed stream and a permeate stream do not mix with each other, a feed side channel spacer 23, and a permeate side channel spacer 22, the laminates being wound in a spiral around a perforated center tube 24, wherein a cladding is wrapped around the outer surface of the wound laminates, and wherein an anti-telescoping plate 25 is attached to at least one end of the wound laminates and the claddings. The perimeter of the anti-telescoping plate 25 includes at least one annular groove 251 into which a stream-to-be-treated sealing material (not illustrated) is fit.

In the separation membrane element 20, a stream-to-be-treated 26 is fed at one end surface and then flows along the feed side channel spacer 23 while passing part of the ingredients (for example, water in the case of desalination of seawater) through the separation membrane 21, thereby separating the stream-to-be-treated into a permeate stream and a concentrate stream. Then, the ingredient that has passed through the separation membrane (permeate water) flows along the permeate side channel spacer 22 into the center tube 24 through holes in a side of the tube, and are passed through the center tube 24 to be collected as a permeate stream 27. On the other hand, the treated water containing a high concentration of a non-permeate ingredient (salt in the case of desalination of seawater) exits from the other end surface of the separation membrane element 20 as a concentrate stream 28 (concentrated water).

Figure 2:
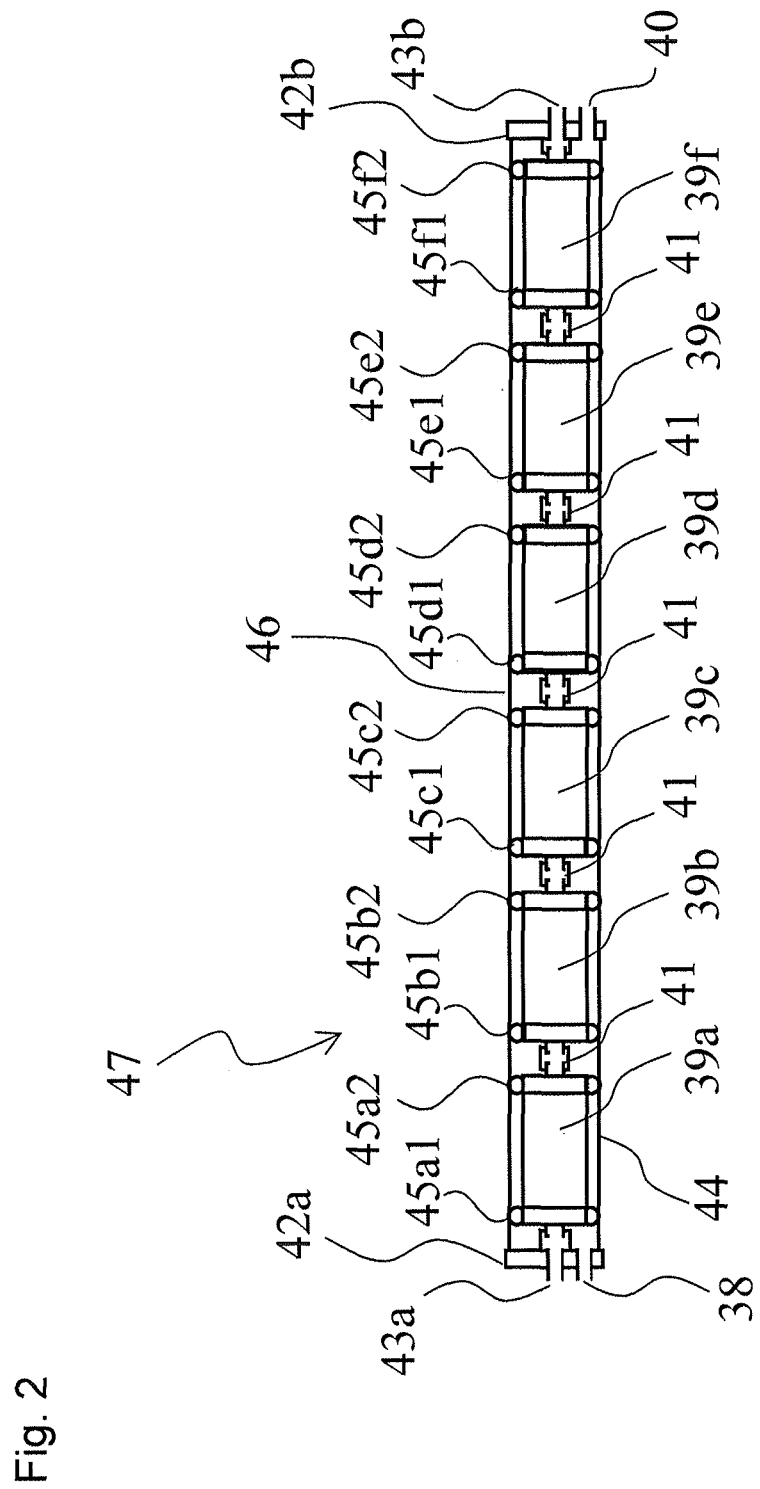
FIG. 2 is a cross-sectional view of an example of a separation membrane module that includes a plurality of spiral-wound membrane elements disposed in a cylindrical pressure vessel, according to the present invention.

In an embodiment of the present invention, one or more of the spiral-wound membrane elements illustrated in FIG. 1 are disposed in a cylindrical pressure vessel 46 to form a separation membrane module 47, as illustrated in FIG. 2. A plurality of separation membrane elements 39 (39a, 39b, 39c, 39d, 39e, and 39f) are disposed in the cylindrical pressure vessel 46 to form the separation membrane module 47. Stream-to-be-treated sealing materials 45 (45a1, 45a2, 45b1-45e2, 45f1, and 45f2) are disposed between the perimeter of at least one of anti-telescoping plates attached to at least one end of the separation membrane elements 39 and the inner wall of the cylindrical pressure vessel 46. The stream-to-be-treated sealing materials 45 are disposed so that the separation membrane elements 39 can be substantially moved in either direction within the cylindrical pressure vessel 46.

The stream-to-be-treated sealing material 45 allows the spiral-wound membrane element 20 as illustrated in FIG. 1 to direct a stream-to-be-treated in the direction of the arrow 26 that represents raw water in FIG. 1, and to introduce a stream-to-be-treated from the end with the arrow 28 that represents concentrated water in FIG. 1.

In FIG. 2, the reference numerals 39a-39f correspond to the separation membrane element 20 illustrated in FIG. 1. A stream-to-be-treated is fed from an inlet 38 for a stream-to-be-treated (40 when the flow direction of the stream-to-be-treated is reversed) and then fed at an end of the first separation membrane element 39a. Then the concentrated water (concentrate stream) produced by the first separation membrane element is fed to the second separation membrane element 39b, and then fed sequentially to the elements 39c, 39d, 39e, and 39f for treatment. Finally, the stream exits from a concentrated water outlet 40 (38 when the flow direction of the stream-to-be-treated is reversed). The center tube of each of the separation membrane elements 39a-39f is connected to each other via a connectors 41, and connected to a permeate stream (permeate water) outlet 43a or 43b at an end plate 42a or 42b respectively to collect, outside the system, a permeate stream (permeate water) produced by each of the separation membrane elements.

Although the inlet 38 for a stream-to-be-treated (40 when the flow direction is reversed) and the concentrated water outlet 40 (38 when the flow direction is reversed) are disposed at the end plates in FIG. 1, they may be disposed adjacent to the end plates of a pressure vessel body 44 (i.e., the inlet 38 for a stream-to-be-treated may be disposed between the end plate 42a and the first separation membrane element 39a, and the concentrated water outlet 40 may be disposed between the end plate 42b and the last separation membrane element 390. It is necessary to form a seal between the pressure vessel 46 and the separation membrane elements 39 to prevent a stream-to-be-treated from passing therebetween so that the performance is not degraded. In particular, the perimeter of the anti-telescoping plate 25 of each of the separation membrane elements 39a-39f preferably includes an annular groove 251, so that each of the stream-to-be-treated sealing materials (hereinafter sometimes simply referred to as "sealing materials") 45a1-45f2 can be disposed in the groove. The sealing materials 45a1, 45a2-45f1, and 45f2 are disposed in the anti-telescoping plate 25 to isolate a stream-to-be-treated from concentrated water in each of the separation membrane elements.

Although a sealing material is disposed on the both sides of each of the separation membrane elements 39a-39f in FIG. 2, a sealing material may be disposed on one side (i.e., 45a1, 45b1, and 45c1-45f1, or 45a2, 45b2, and 45c2-45f2). Although a separation membrane element that includes a sealing material on the both sides provides better sealing, the element is more difficult to insert and remove and tends to generate dead space between adjacent sealing materials (for example, between 45a1 and 45a2), so such configuration is not preferred if, for example, contamination of the concentrate stream is undesirable in the case of concentration of juice and the like.

Figure 3:
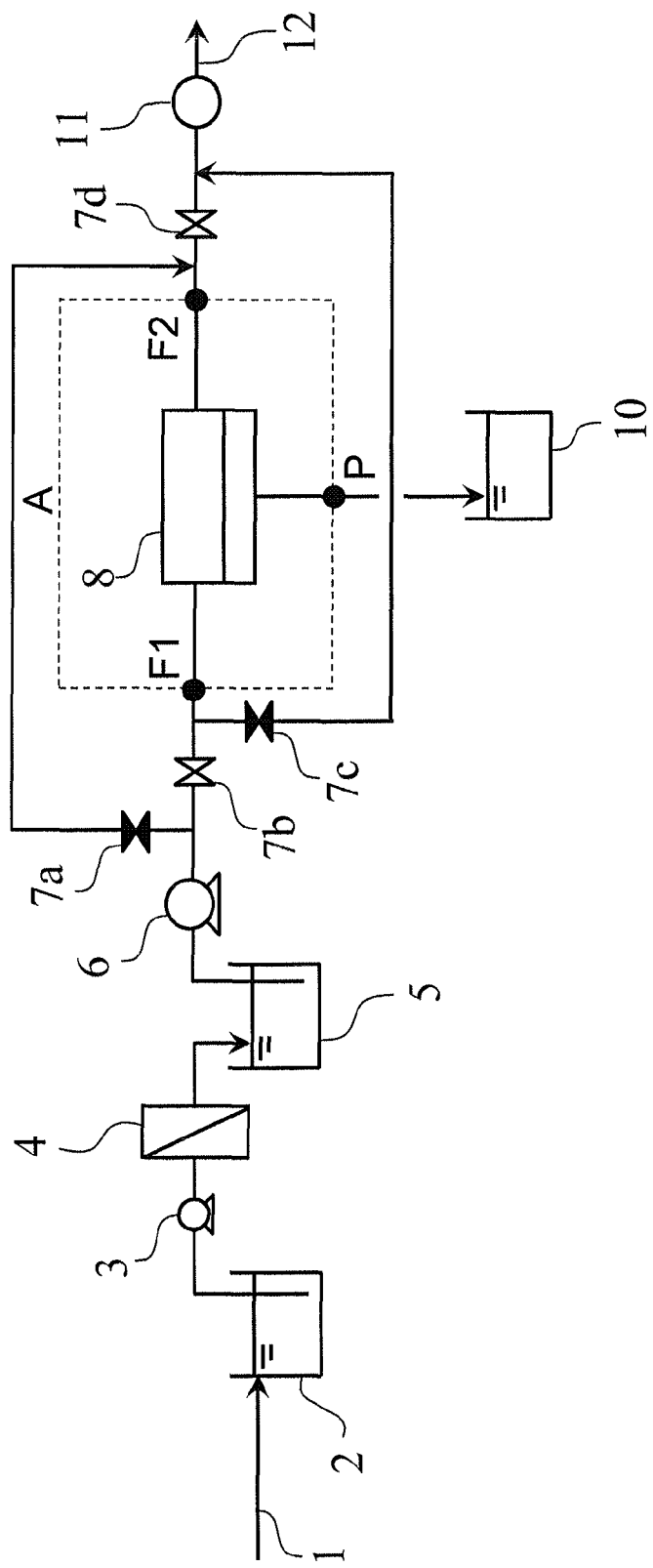
FIG. 3 is a flow diagram that illustrates an example of an embodiment of a separation membrane device according to the present invention.

FIG. 3 is a flow diagram that illustrates an example of an embodiment of a membrane separation device for water treatment, according to the present invention.

In FIG. 3, a unit for feeding a stream-to-be-treated includes a raw water tank 2, a raw water feed pump 3, and optionally, a pretreatment unit 4, a pretreated water tank 5, and a pressure pump 6. Raw water 1 is fed to the raw water tank 2, and then pumped by the raw water feed pump 3. After treatment by the pretreatment unit 4, where necessary, the water is stored in the pretreated water tank 5. The pretreated water is fed to a separation membrane unit A by the pressure pump 6. In the example in FIG. 3, the separation membrane unit A includes a single separation membrane unit component 8. The separation membrane unit component includes one or more of the separation membrane modules 47 that include a plurality of separation membrane elements 39 disposed in the cylindrical pressure vessel 46, as illustrated in FIG. 2. The separation membrane unit A can include one or more separation membrane unit components.

The separation membrane unit A also includes feed stream side lines (hereinafter sometimes referred to as "feed water side lines") F1 and F2, and a permeate stream line (hereinafter sometimes referred to as "permeate water line") P that can be used to feed pretreatment water or to discharge concentrated water. The feed water side lines F1 and F2 include valves 7a-7d, and one of the feed water side lines F1 and F2 communicates with the pressure pump 6, while the other line communicates with a water discharge line 12. Thus, in FIG. 3, when the valves 7a and 7c, which are represented as a black mark, are closed, and the valves 7b and 7d, which are represented as a white mark, are opened, a stream-to-be-treated pressurized by the pressure pump 6 is fed through the feed water side line F1 to the separation membrane unit A, and the concentrate stream (hereinafter sometimes referred to as "concentrated water") is discharged through the feed water side line F2. On the other hand, when the valves 7a and 7c are opened, and the valves 7b and 7d are closed, a stream-to-be-treated is fed through the feed water side line F2, and the concentrated water is discharged through the feed water side line F1. Thus, the unit includes a mechanism that can switch the flow of a stream-to-be-treated in the separation membrane unit A between the feed water side line F1 and the feed water side line F2. In this case, an energy recovery unit 11 can be used to recover energy from the concentrated water, where necessary.

Figure 4:
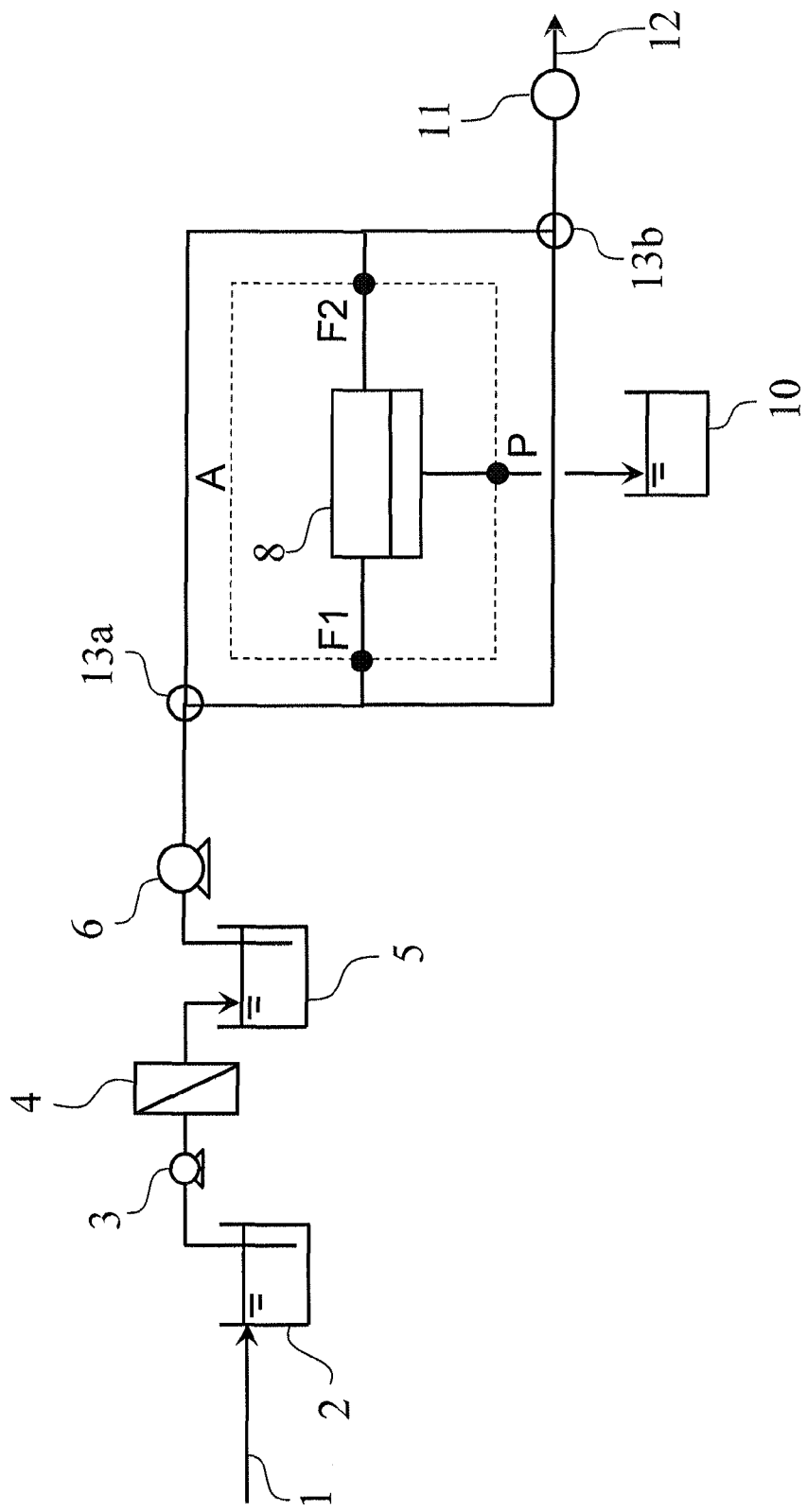
FIG. 4 is a flow diagram that illustrates another example of an embodiment of a separation membrane device according to the present invention.

Although the four valves 7a-7d are used to switch the flow in FIG. 3, a mechanism that includes three-way valves 13a and 13b can be used to switch the flow so that one of the feed water side lines F1 and F2 becomes the stream-to-be-treated feed side, and the other line becomes the concentrate stream discharge side, as illustrated in FIG. 4.

The separation membrane unit A illustrated in FIG. 3 and FIG. 4 is an example of an embodiment that includes a single separation membrane unit component 8. In contrast, the separation membrane unit A can be configured to include a plurality of separation membrane unit components. In the present specification, one or more separation membrane unit components that first treat a stream-to-be-treated are referred to as "subunit (A)", and one or more separation membrane unit components that subsequently treat the concentrated water discharged from the subunit (A) are referred to as "subunit (B)". And one or more separation membrane unit components that subsequently treat the concentrated water discharged from the subunit (B) are referred to as "subunit (C)". Furthermore, a unit configuration in which a stream-to-be-treated is fed through F1 is referred to as subunits (A), (B), and (C), while a unit configuration in which a stream-to-be-treated is fed through F2 is referred to as subunits (A'), (B'), and (C').

Figure 5:
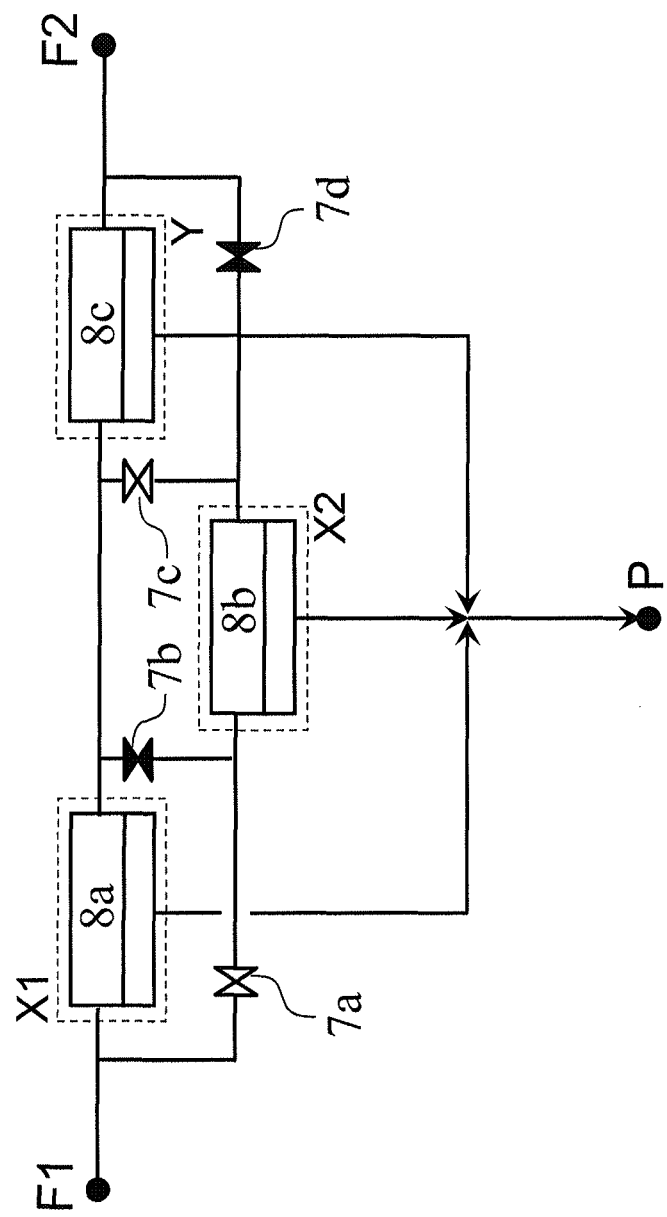
FIG. 5 is a flow diagram that illustrates an embodiment in which concentrated water produced by a prior subunit is treated by the next subunit, as an example of a separation membrane unit applicable to the present invention.

In FIG. 5, a separation membrane unit includes separation membrane unit components 8a, 8b, and 8c, which constitute subunits (A) and (B). In a first embodiment in which a stream-to-be-treated is fed through F1, the separation membrane unit components 8a and 8b constitute the subunit (A), and the separation membrane unit component 8c constitutes the subunit (B). In a second embodiment in which a stream-to-be-treated is fed through F2, the separation membrane unit components 8c and 8b constitute the subunit (A'), and the separation membrane unit component 8a constitutes the subunit (B'). To describe the membrane area of each of the separation membrane unit components, the separation membrane unit components 8a, 8b, and 8c are sometimes referred to as separation membrane unit components X1, X2, and Y, respectively.

The separation membrane unit A enclosed by the dashed line in FIG. 3 or 4 can be replaced by a unit having the configuration in FIG. 5. The separation membrane units illustrated in FIGS. 6-13, which are described below, also can be incorporated into the separation membrane device illustrated in FIG. 3 or 4.

As illustrated in FIG. 5, a stream-to-be-treated is fed through F1, and then fed simultaneously to the unit components (X1 and X2) constituting the prior subunit (A), which first treats the stream, thereby treating the stream by the membranes. The concentrated water produced by the prior subunit (A) is fed to the next subunit (B) constituted by the next unit component (Y), thereby treating the stream by the membranes. Then the concentrated water is discharged through F2, and the permeate water is discharged through a permeate stream line P. In FIG. 5, when the feed direction of a stream-to-be-treated is reversed, that is, when the stream-to-be-treated is fed through F2, the direction of the flow through the separation membrane unit components 8a, 8b, and 8c, which constitute the prior subunit (A') and the next subunit (B'), is changed. In the example in FIG. 5, it is preferred to change the flow direction so that a stream-to-be-treated is fed simultaneously to the separation membrane unit components 8b and 8c, which first treat the stream as the subunit (A'), and so that the separation membrane unit component 8a becomes the next subunit (B').

In this case, the membrane area of the next subunit (B) is preferably equal to or smaller than the total membrane area of the prior subunit (A). More preferably, the total membrane area of the next subunit (B) is smaller than the total membrane area of the prior subunit (A). Preferably, such relationship is obtained both when a stream-to-be-treated is fed through the feed water side line F1 and when a stream-to-be-treated is fed through the feed water side line F2.

To achieve this, a plurality of separation membrane unit components are combined so as to treat a stream-to-be-treated at least in two stages. For example, the unit is configured to feed the stream to the subunit (A) constituted by the prior unit components (X1 and X2), and to feed the concentrated water produced by the subunit (A) to the subunit (B) constituted by the remaining unit component (Y), when a stream-to-be-treated is fed through the feed water side line F1. And if the total membrane area of the subunit (A) is taken as Sa (=the membrane area of X1, Sx1+ the membrane area of X2, Sx2), and the total membrane area of the subunit (B) is taken as Sb (=the membrane area of Y, Sy), the total membrane area Sa is preferably larger than Sb [i.e., (Sx1+Sx2)>Sy].

When a stream-to-be-treated is fed through the feed water side line F2, the unit components (Y) and (X2) are connected in parallel to constitute the subunit (A'), and then a stream-to-be-treated is first fed to the subunit (A') constituted by the unit components (Y) and (X2). Then the concentrated water produced by these unit components (Y) and (X2) is fed to the subunit (B') constituted by the unit component (X1), thereby allowing treatment. In this case, the total membrane area Sa (=the membrane area of Y, Sy+ the membrane area of X2, Sx2) of the subunit (A'), which first treats a stream-to-be-treated, is preferably larger than the total membrane area Sb (=the membrane area of X1, Sx1) of the subunit (B'), which next treats the stream [(Sy+Sx2)>Sx1].

For example, in the case of FIG. 5, the unit includes the separation membrane unit component 8a as the unit component (X1), the separation membrane unit component 8b as the unit component (X2), and the separation membrane unit component 8c as the unit component (Y). When a stream-to-be-treated is fed through the feed water side line F1, the valves 7a and 7c are opened, and the valves 7b and 7d are closed to feed a stream-to-be-treated simultaneously to 8a and 8b in the prior subunit (A). Then the resulting concentrated water is fed to 8c, which constitutes the next subunit (B), for treatment. On the other hand, when a stream-to-be-treated is fed through the feed water side line F2, the valves 7a and 7c are closed, and the valves 7b and 7d are opened to feed a stream-to-be-treated, through the feed water side line F2, simultaneously to 8b and 8c, which constitute the prior subunit (A'), in the reverse direction in each of the separation membrane unit components. Then the resulting concentrated water is fed, in the reverse direction, to 8a, which constitutes the subunit (B'), for treatment. Both when a stream-to-be-treated is fed through the feed water side lines F1 and when a stream-to-be-treated is fed through the feed water side lines F2, the unit can be configured to include two separation membrane unit components that constitute the prior subunit and one separation membrane unit component that constitutes the next subunit, in terms of treatment of a stream-to-be-treated by the overall membrane separation unit.

A stream-to-be-treated may be treated in three stages. More specifically, a subunit (C) is added, as a subunit in a third stage, to the subunits (A) and (B) described above, and the subunit (C) can be constituted by one or more separation membrane unit components for subsequently treating the concentrated water discharged from the subunit (B).

Figure 6:
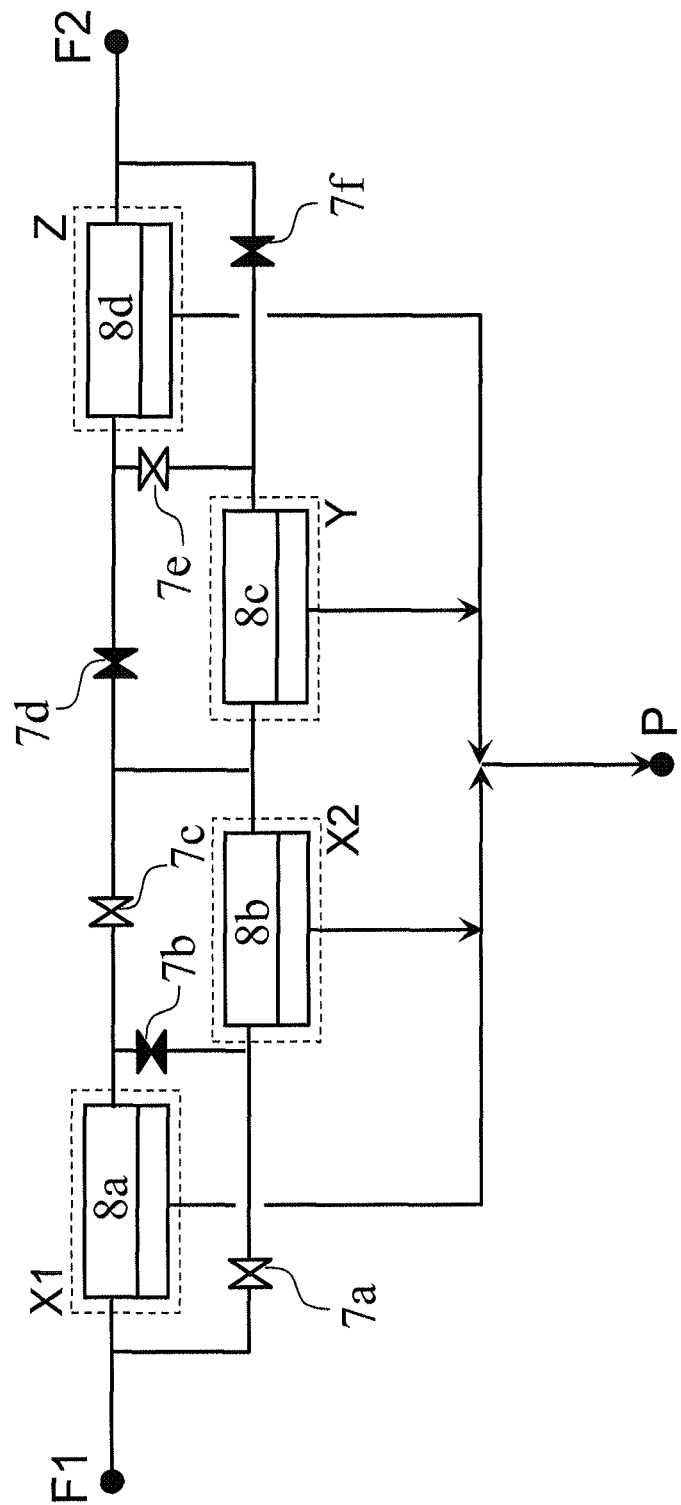
FIG. 6 is a flow diagram that illustrates another example of an embodiment in which concentrated water produced by a prior subunit is treated by the next subunit, as an example of a separation membrane unit applicable to the present invention.

As shown in FIG. 6, if a stream-to-be-treated is fed through the feed water side line F1, the unit is configured to first feed the stream-to-be-treated to the subunit (A) constituted by the prior unit components (X1 and X2), then to feed the concentrated water produced by the subunit (A) to the next subunit (B) constituted by the unit component (Y), and to feed the concentrated water produced by the subunit (B) to the last subunit (C) constituted by a unit component (Z).

Furthermore, if the total membrane area of the subunit (A) is taken as Sa (=Sx1+Sx2), the total membrane area of the subunit (B) is taken as Sb (=Sy), and the total membrane area of the subunit (C) is taken as Sc (=Sz), the total membrane area Sa is preferably larger than Sb [(Sx1+Sx2)>Sy]. And the total membrane area Sb is preferably equal to or larger than Sc [Sy≥Sz] (i.e., Sa>Sb≥Sc).

In this case, when a stream-to-be-treated is fed through the feed water side line F2, the unit components (Y) and (Z) are connected in parallel to constitute the subunit (A'), and a stream-to-be-treated is first fed to the subunit (A'). Then the concentrated water produced by the subunit (A') is fed to the subunit (B') constituted by the unit component (X2), and after treatment, the resulting concentrated water is fed to the subunit (C') constituted by the unit component (X1), thereby allowing treatment. Thus, the total membrane area Sa of the subunit (A'), which first treats a stream-to-be-treated, (=the membrane area of Y, Sy+ the membrane area of Z, Sz) is larger than the total membrane area Sb of the subunit (B'), which next treats the stream, (=the membrane area of X2, Sx2) [(Sy+Sz)>Sx2]. The total membrane area Sb is equal to or larger than the total membrane area Sc of subunit (C'), which subsequently treats the stream, (=the membrane area of X1, Sx1) (Sx2≥Sx1).

Furthermore, in order to achieve the configuration as described above, both when a stream-to-be-treated is fed in the forward direction and when a stream-to-be-treated is fed in the reverse direction, the total membrane area of (A) is preferably equal to the total membrane area of (B)+ the total membrane area of (C) (Sx1+Sx2=Sy+Sz), and most preferably, the group of the unit components (X1+X2) have the same configuration as the group of the unit components (Y) and (Z).

As an example of the above configuration, the unit of FIG. 6 is constituted by a separation membrane unit component 8a as the unit component (X1), a separation membrane unit component 8b as the unit component (X2), a separation membrane unit component 8c as the unit component (Y), and a separation membrane unit component 8d as the unit component (Z). When a stream-to-be-treated is fed through the feed water side line F1, valves 7a, 7c, and 7e are opened, and valves 7b, 7d, and 7f are closed to feed a stream-to-be-treated simultaneously to 8a and 8b of the prior subunit (A), then to feed the resulting concentrated water to 8c, which is the next subunit (B), and to feed the concentrated water produced by 8c to 8d, which is the subunit (C), for treatment. On the other hand, when a stream-to-be-treated is fed through the feed water side line F2, the valves 7a, 7c, and 7e are closed, and the valves 7b, 7d, and 7f are opened to feed the stream-to-be-treated through the feed water side line F2 simultaneously to 8c and 8d, which constitute the prior subunit (A'), in the reverse direction in each of the separation membrane unit components 8c and 8d, thereby treating the stream. Then the resulting concentrated water is fed, in the reverse direction, to 8b, which constitutes the subunit (B'), and then the resulting concentrated water is fed, in the reverse direction, to 8a, which constitutes the subunit (C'), for treatment. Both when a stream-to-be-treated is fed through the feed water side line F1 and when a stream-to-be-treated is fed through the feed water side line F2, the unit can be configured to include two separation membrane unit components that constitute subunit (A), one separation membrane unit component that constitutes subunit (B), and one separation membrane unit component that constitutes subunit (C), in terms of treatment of a stream-to-be-treated by the overall membrane separation unit.

Figure 7:
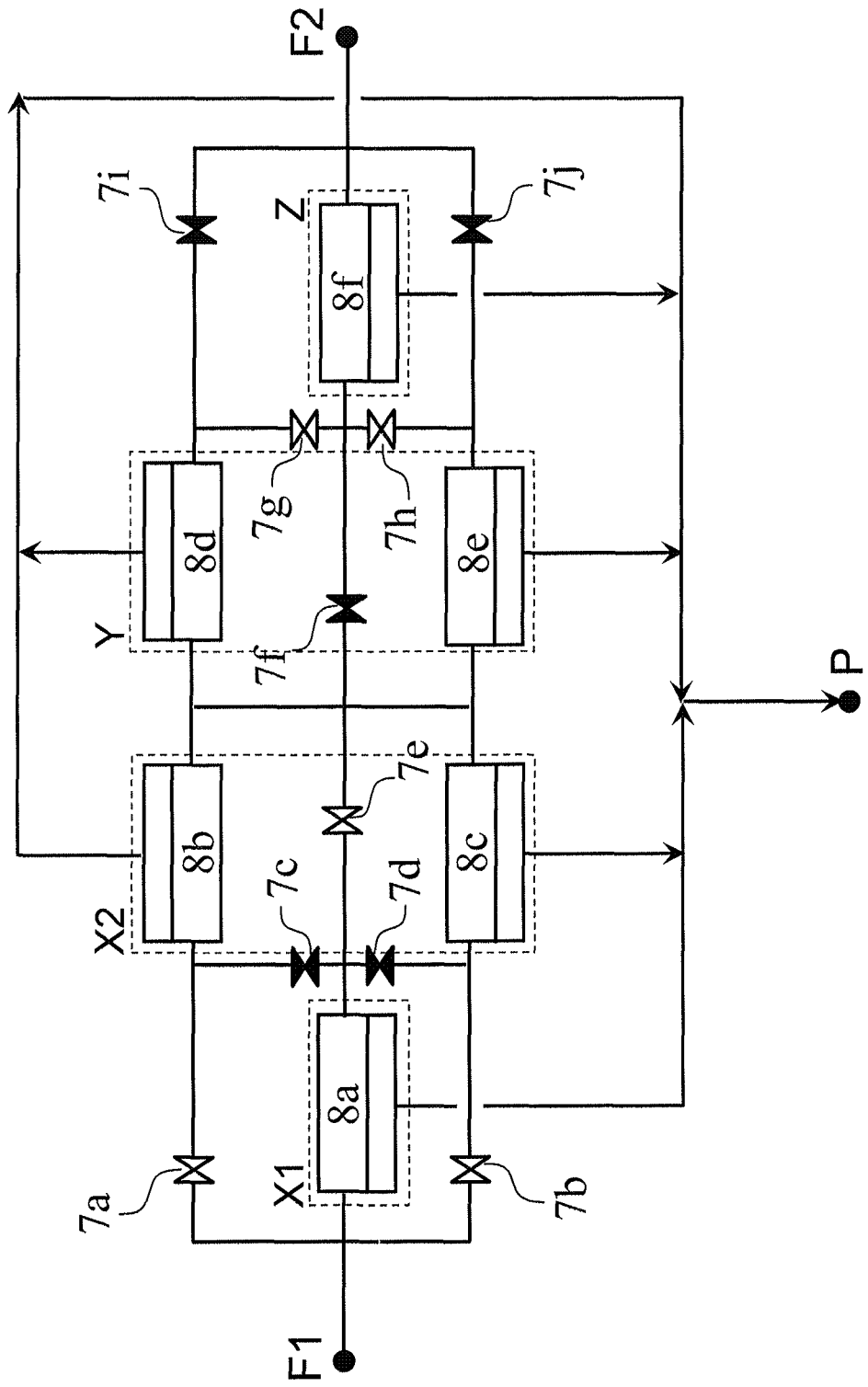
FIG. 7 is a flow diagram that illustrates still another example of an embodiment in which concentrated water produced by a prior subunit is treated by the next subunit, as an example of a separation membrane unit applicable to the present invention.

As another example of the configuration, the subunits (A) and (A') can be constituted by three separation membrane unit components, the subunits (B) and (B') can be constituted by two separation membrane unit components, and the subunits (C) and (C') can be constituted by one separation membrane unit component. In FIG. 7, the unit includes one or more separation membrane unit components: a separation membrane unit component 8a as a unit component (X1), separation membrane unit components 8b and 8c as a unit component (X2), separation membrane unit components 8d and 8e as a unit component (Y), a separation membrane unit component 8f as a unit component (Z). When a stream-to-be-treated is fed through the feed water side line F1, valves 7a, 7b, 7e, 7g, and 7h are opened, and the remaining valves are closed to feed a stream-to-be-treated simultaneously to 8a, 8b, and 8c, which constitute the prior subunit (A) to which the water-to-be-treated is first fed, then to feed the resulting concentrated water to 8d and 8e, which constitute the subunit (B), and to feed the concentrated water produced by the subunit (B) to 8f, which constitutes the subunit (C), for treatment. On the other hand, when a stream-to-be-treated is fed through the feed water side line F2, valves 7c, 7d, 7f, 7i, and 7j are opened, and the remaining valves are closed to first feed the water-to-be-treated simultaneously to 8d, 8e, and 8f as the prior subunit (A'), then to feed the resulting concentrated water to 8b and 8c, which constitute the subunit (B'), and to feed the resulting concentrated water to 8a, which constitutes the subunit (C'), for treatment. Also in this configuration example, the total membrane areas of the subunits exhibit the relationship of Sb≥Sc and Sa=Sb+Sc. Both when a stream-to-be-treated is fed through the feed water side line F1 and when a stream-to-be-treated is fed through the feed water side line F2, the unit can be configured to include three separation membrane unit components that constitute the subunit (A), two separation membrane unit components that constitute the subunit (B), and one separation membrane unit component that constitutes the subunit (C).

Figure 8:
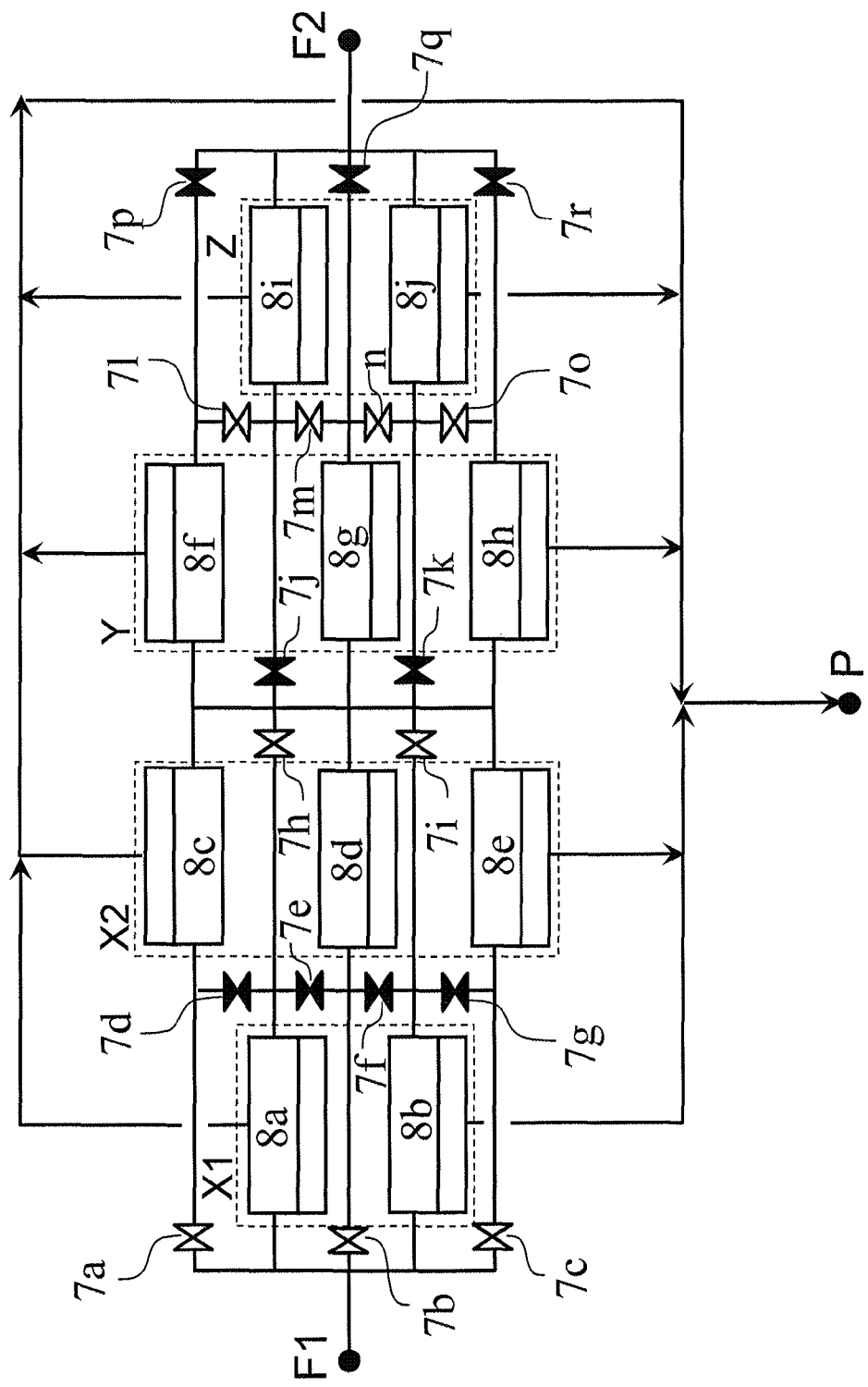
FIG. 8 is a flow diagram that illustrates still another example of an embodiment in which concentrated water produced by a prior subunit is treated by the next subunit, as an example of a separation membrane unit applicable to the present invention.

The device illustrated in FIG. 8 is similar. In FIG. 8, the subunits (A) and (A') can be constituted by five separation membrane unit components, the subunits (B) and (B') can be constituted by three separation membrane unit components, and the subunit (C) and (C') can be constituted by two separation membrane unit components. When a stream-to-be-treated is fed through the feed water side line F1, valves 7a, 7b, 7c, 7h, 7i, 7l, 7m, 7n, and 7o are opened, and the remaining valves are closed to feed the water-to-be-treated simultaneously to 8a, 8b, 8c, 8d, and 8e as the subunit (A) to which water-to-be-treated is first fed, then to feed the resulting concentrated water to 8f, 8g, and 8h, which constitute the subunit (B), and to further feed the resulting concentrated water to 8i and 8j, which constitute the subunit (C), for treatment. On the other hand, when a stream-to-be-treated is fed through the feed water side line F2, valves 7d, 7e, 7f, 7g, 7j, 7k, 7p, 7q, and 7r are opened, and the remaining valves are closed to feed the water-to-be-treated simultaneously to 8i, 8j, 8f, 8g, and 8h as the prior subunit (A'), then to feed the resulting concentrated water to 8c, 8d, and 8e, which constitute the subunit (B'), and to feed the resulting concentrated water to 8a and 8b, which constitute the subunit (C'), for treatment. Also in this configuration example, the total membrane areas of the subunits exhibit the relationships of Sb≥Sc and Sa=Sb+Sc. Both when a stream-to-be-treated is fed through the feed water side line F1 and when a stream-to-be-treated is fed through the feed water side line F2, the unit can be configured to include five separation membrane unit components that constitute the subunit (A), three separation membrane unit components that constitute the subunit (B), and two separation membrane unit components that constitute the subunit (C). The present invention is not limited to a two-stage unit as illustrated in FIG. 5 and a three-stage unit as illustrated in FIG. 6-FIG. 8, and the present invention can also be applied to four or more-stage configurations.

Figure 9:
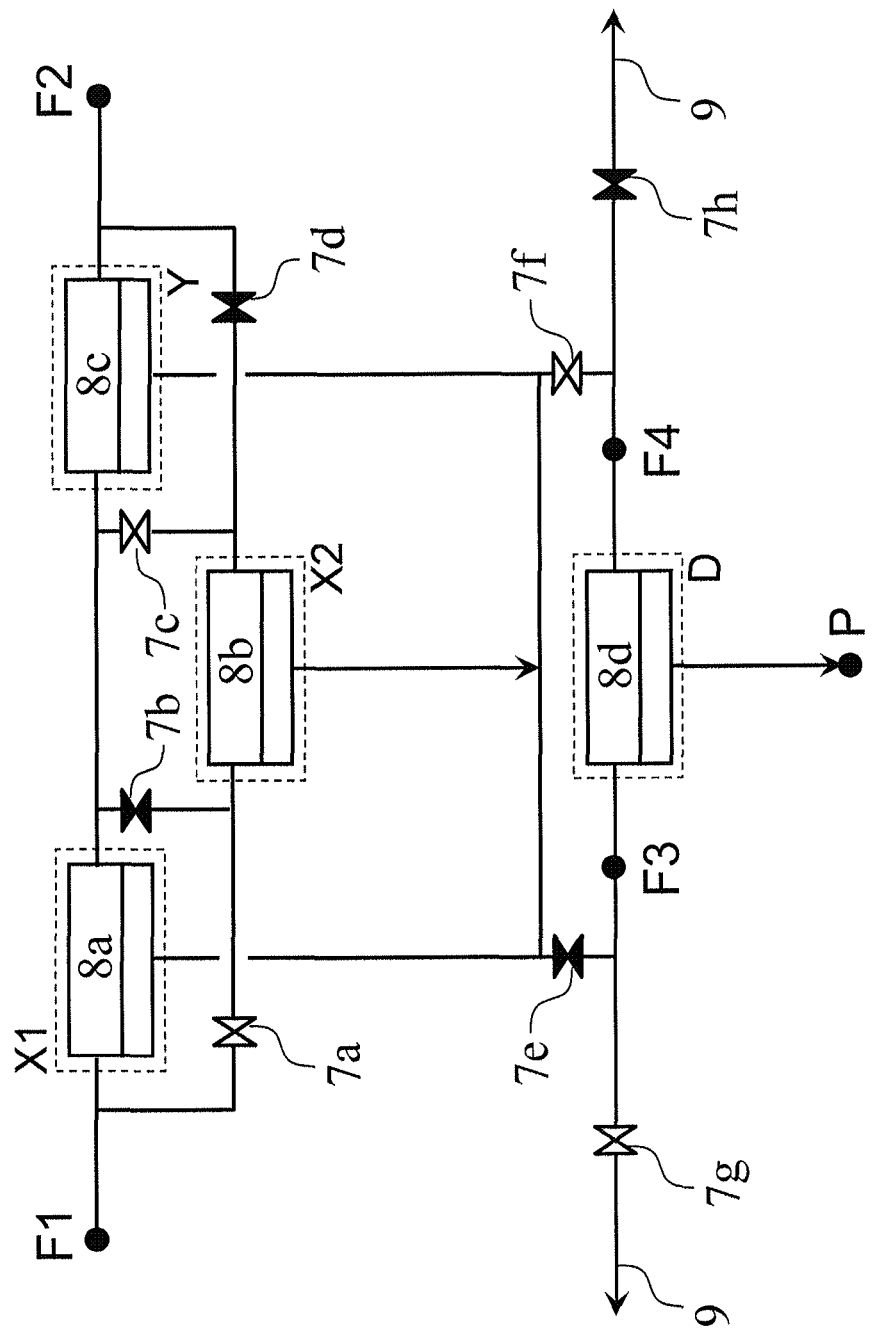
FIG. 9 is a flow diagram that illustrates an embodiment in which a subunit for additionally treating permeate water is added to the configuration illustrated by the flow diagram of FIG. 5.

Furthermore, the present invention can also be applied to a process in which one or more other separation membrane unit components are used to additionally treat permeate water discharged from any of separation membrane unit components, called a two-step water permeation process. More specifically, for example, as illustrated in FIG. 9, a subunit (D) for additionally treating permeate water can be added to the configuration illustrated by the flow diagram of FIG. 5 to provide a two-step water permeation process. In FIG. 9, permeate water from the separation membrane unit components 8a, 8b, and 8c is treated by a separation membrane unit component 8d as the subunit (D) in the second stage. In this case, it is also preferred to reverse the flow direction of a stream-to-be-treated in the subunit (D), as needed. For example, in FIG. 9, valves 7f and 7g are closed, and valves 7e and 7h are opened to feed permeate water discharged from the separation membrane unit components 8a, 8b, and 8c to the separation membrane unit component 8d through the feed water side line F3. Alternatively, the valves 7f and 7g are opened, and the valves 7e and 7h are closed to feed permeate water discharged from the separation membrane unit components 8a, 8b, 8c to the separation membrane unit component 8d through the feed water side line F4. Thus, provision of a mechanism that switches the flow between the feed water side lines F3 and F4 by opening or closing the valves 7f and 7g and valves 7e and 7h allows the flow direction of a stream-to-be-treated in subunit (D) to be changed.

Figure 10:
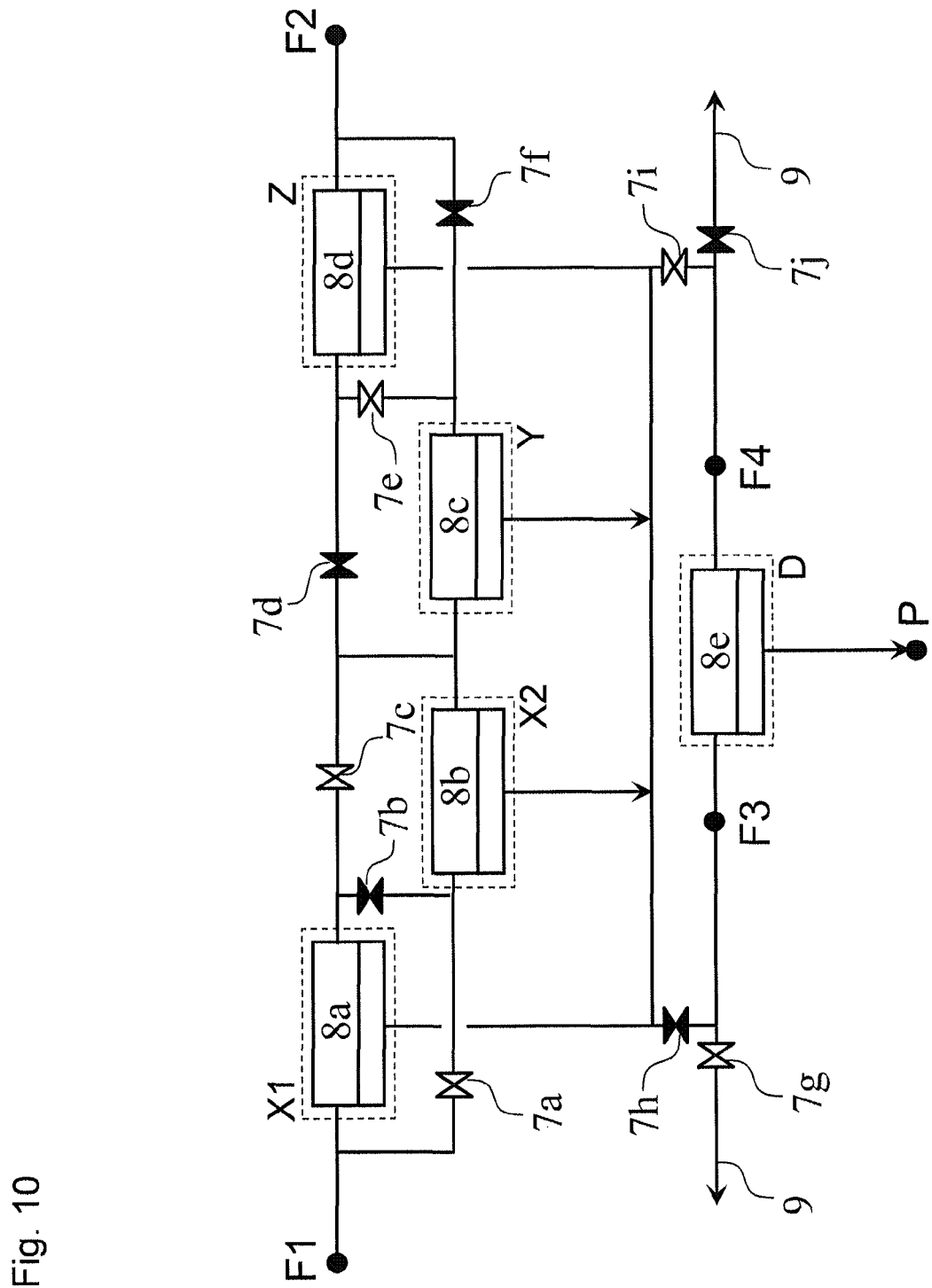
FIG. 10 is a flow diagram that illustrates an embodiment in which a subunit for additionally treating permeate water is added to the configuration illustrated by the flow diagram of FIG. 6.

As another embodiment, as illustrated in FIG. 10, a subunit (D) for additionally treating permeate water can be added to the configuration illustrated by the flow diagram of FIG. 6 to provide a two-step water permeation process. In FIG. 10, the permeate water discharged from separation membrane unit components 8a, 8b, 8c, and 8d is treated by a separation membrane unit component 8e as the subunit (D) in the second stage. In this case, it is also preferred to reverse the flow direction of a stream-to-be-treated in the subunit (D), as needed. More specifically, in FIG. 10, provision of a mechanism that changes the flow direction by closing valves 7g and 7i and opening valves 7h and 7j, or opening the valves 7g and 7i and closing the valves 7h and 7j allows the flow of a stream-to-be-treated in the subunit (D) to be switched between the feed water side line F3 and the feed water side line F4.

Figure 11:
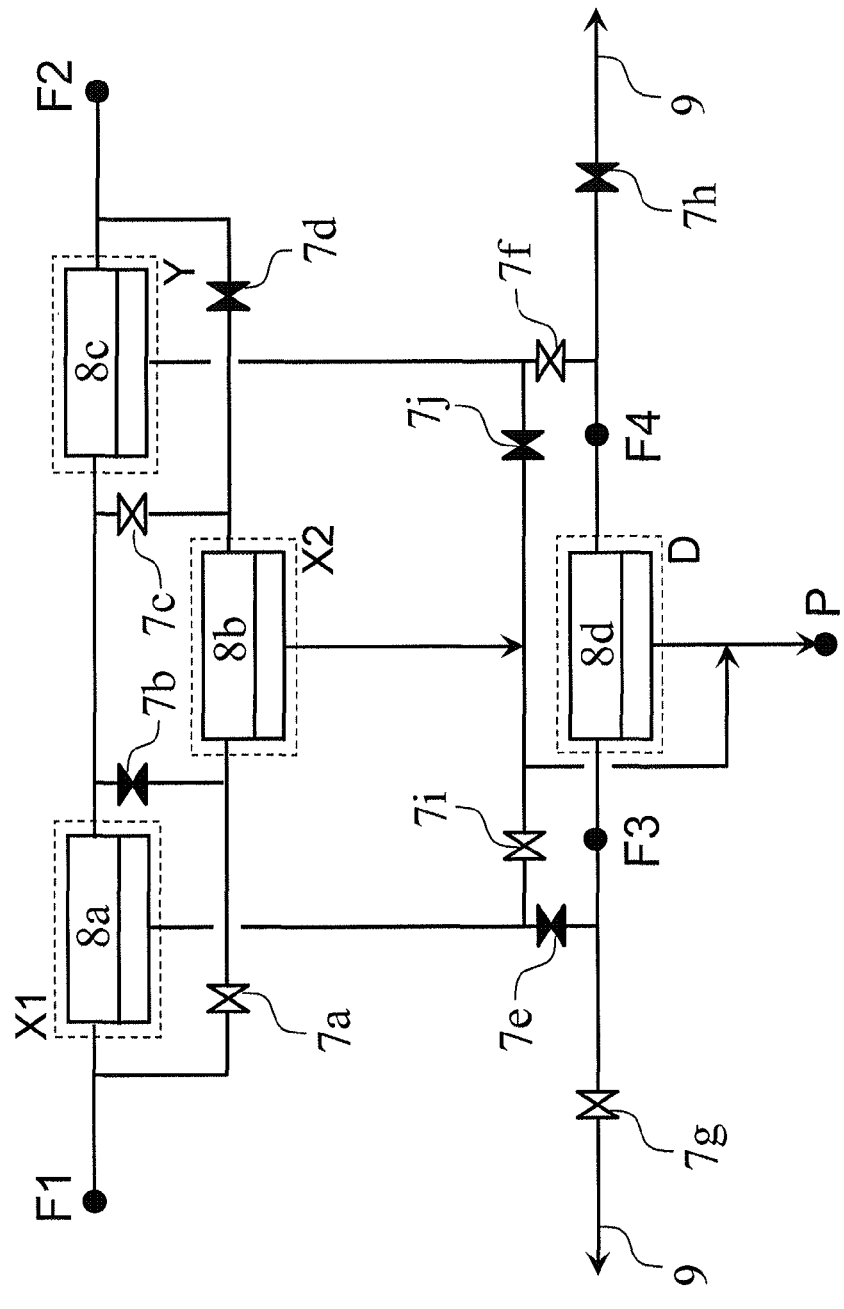
FIG. 11 is a flow diagram that illustrates another embodiment in which a subunit for additionally treating part of permeate water is added to the configuration illustrated by the flow diagram of FIG. 5.
Figure 12:
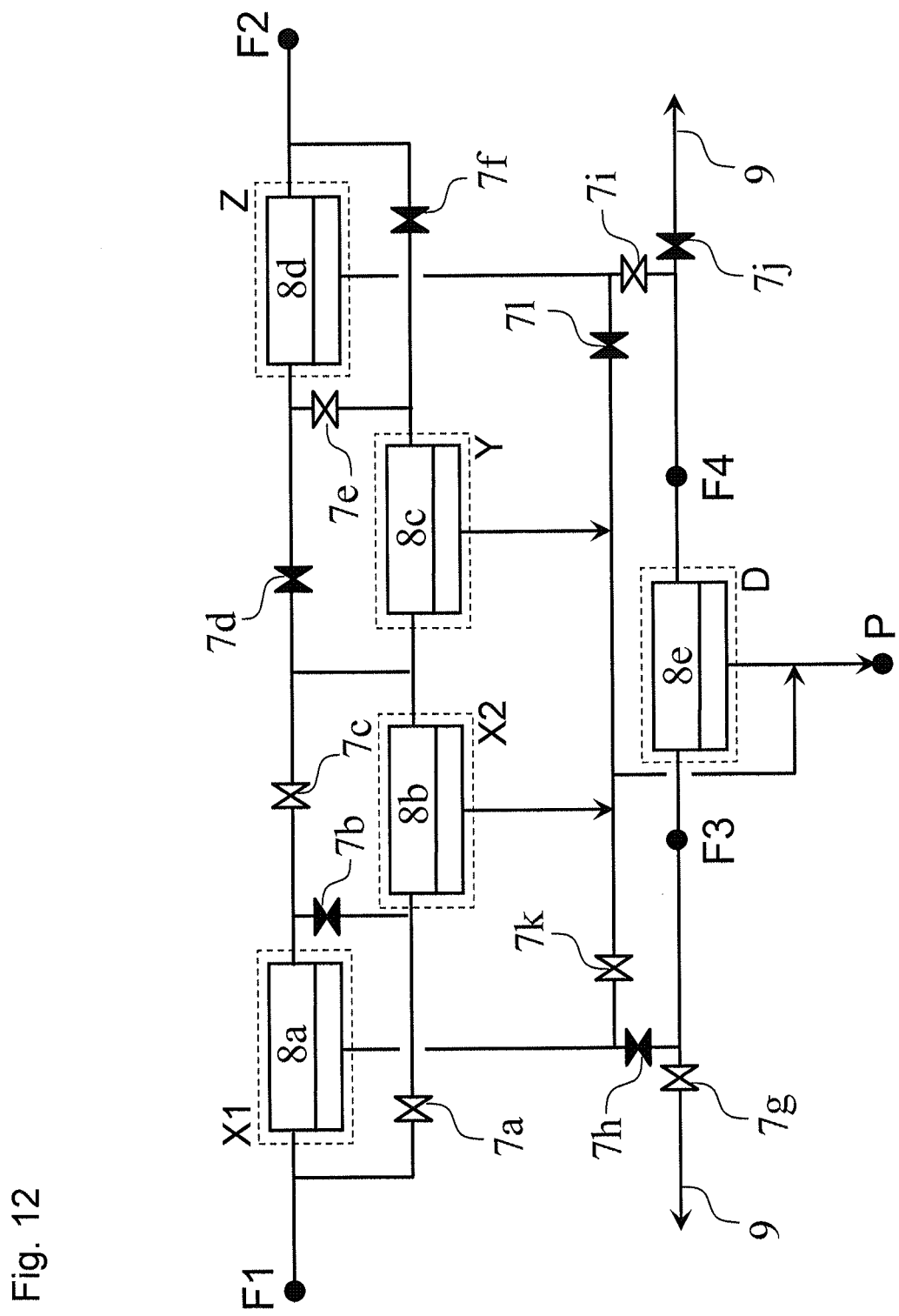
FIG. 12 is a flow diagram that illustrates another embodiment in which a subunit for additionally treating part of permeate water is added to the configuration illustrated by the flow diagram of FIG. 6.
Figure 13:
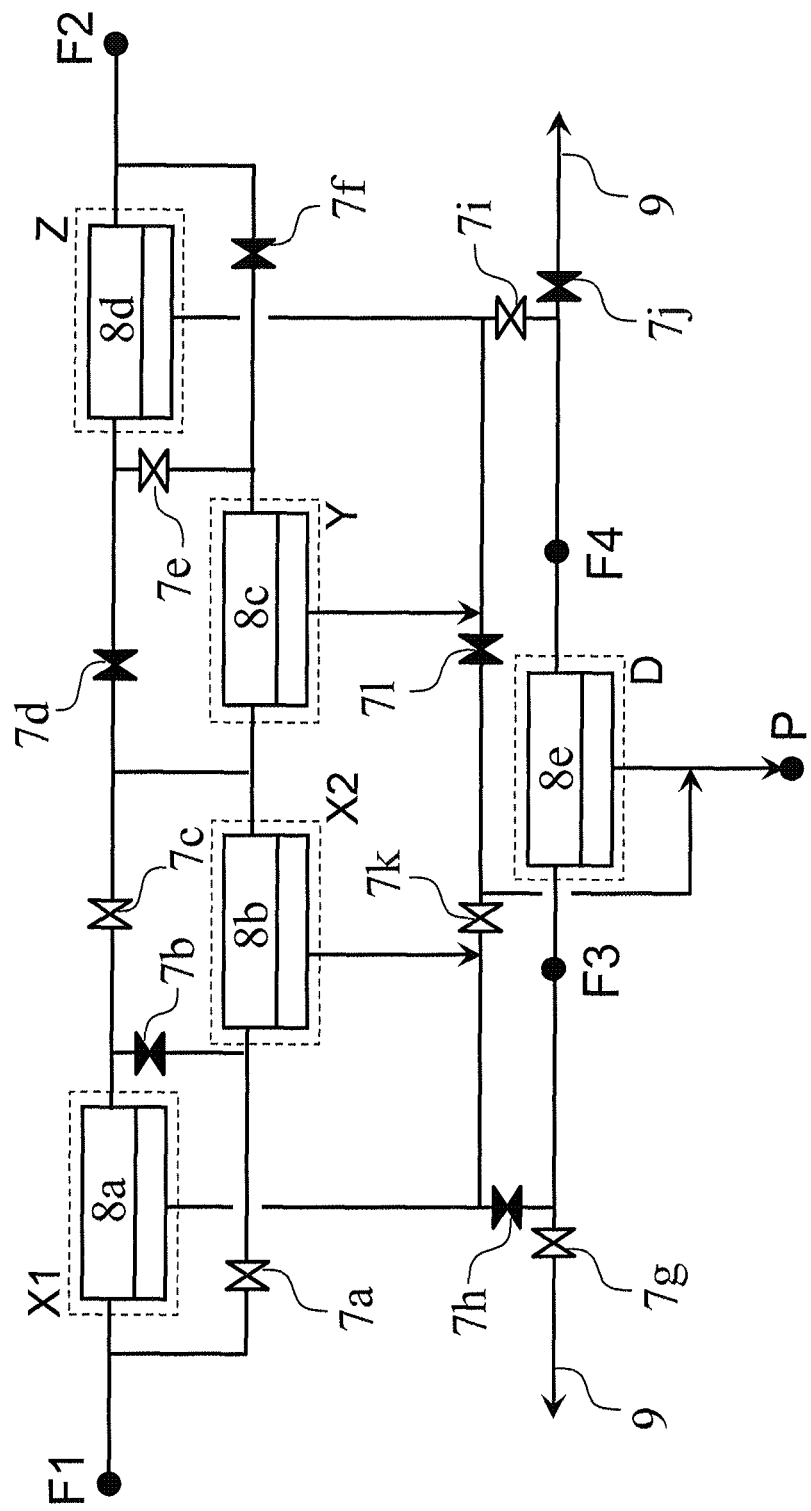
FIG. 13 is a flow diagram that illustrates still another embodiment in which a subunit for additionally treating part of permeate water is added to the configuration illustrated by the flow diagram of FIG. 6.

When permeate water discharged from the subunit (A) in the first stage or from the subunits (A) in the first stage and the subunit (B) in the second stages is not treated, and only permeate water that has a relatively lower water quality and has been discharged from a subunit in a later stage (subunit (B) in the second stage in FIG. 9, and the subunit (C) in the third stage in FIG. 10) is treated by the subunit (D) for providing a two-step water permeation process, the unit can be configured as illustrated in FIGS. 11, 12, and 13.

FIG. 11 illustrates a two-step water permeation system in which a subunit (D) for additionally treating part of permeate water is added to the configuration illustrated by the flow diagram of FIG. 5. In the example of FIG. 11, when a stream-to-be-treated is fed through the feed water side line F1, valves 7a, 7c, 7f, 7g, and 7i are opened, and the remaining valves are closed to feed only permeate water discharged from the unit component 8c, which constitutes the subunit (B) in the second stage, to the unit component 8d, which constitutes the subunit (D) for providing a two-step water permeation process, through the feed water side line F4, thereby allowing treatment. When water-to-be-treated is fed through the feed water side line F2, valves 7b, 7d, 7e, 7h, and 7j are opened, and the remaining valves are closed to feed only permeate water discharged from a unit component 8a, which constitutes a subunit (a) in the second stage, to 8d, which constitutes a subunit (D) for providing a two-step water permeation process, through a feed water side line F3, thereby allowing treatment when changing the feed direction of the stream-to-be-treated.

And FIG. 12 illustrates a two-step water permeation process in which a subunit (D) for additionally treating part of permeate water is added to the configuration illustrated by the flow diagram of FIG. 6. In FIG. 12, when a stream-to-be-treated is fed through a feed water side line F1, valves 7a, 7c, 7e, 7g, 7i, and 7k are opened, and the remaining valves are closed to feed only permeate water discharged from a unit component 8d, which constitutes a subunit (C) in the third stage, to a unit component 8e, which constitutes a subunit (D) for providing a two-step water permeation process, through a feed water side line F4, thereby allowing treatment. When water-to-be-treated is fed through a feed water side line F2, valves 7b, 7d, 7f, 7h, 7j, and 7l are opened, and the remaining valves are closed to feed only permeate water discharge from a unit component 8a, which constitutes a subunit (C') in the third stage, through a feed water side line F3, thereby allowing treatment when changing the feed direction of the stream-to-be-treated fed to a unit component 8e, which constitutes a subunit (D) for providing a two-step water permeation process, which is a highly preferred embodiment. Obviously, if it is desired to treat not only permeate water discharged from the subunit (C) in the third stage, but also permeate water discharged from the subunit (B) in the second stage by the subunit (D) for providing a two-step water permeation process in FIG. 12, the desire can be achieved by altering the position of the valves 7k and 7l, as illustrated in FIG. 13. Furthermore, concentrated water 9 in the second stage discharged from the subunit (D) in FIG. 9, FIG. 10, FIG. 11, FIG. 12, and FIG. 13 has usually a better water quality compared with the stream-to-be-treated, and thus reflux of the water 9 back to the side that receives the water-to-be-treated in the feed water side line F1 or F2 is also a preferred embodiment.

Although there are no constraints on control of the feed direction of a stream-to-be-treated as described above, it is preferred to alternately switch the flow of a stream-to-be-treated between feed stream side lines F1 and F2 periodically or as needed based on monitoring of the contamination, thereby treating the stream, in view of the object of inhibiting contamination of separation membrane unit components.

Particularly, if the feed direction of a stream-to-be-treated is periodically changed, it is economical and efficient to match the direction change with stopping of the device, for example, as in the case of using only midnight power to operate the device. And it is also suitable to periodically wash the membranes by reversing the feed direction of a stream-to-be-treated. On the other hand, if the contamination is monitored, a process involving monitoring pressure loss between a stream-to-be-treated (feed water) and concentrated water, pressure differential between a feed water side and a permeate-water side, concentration of contaminants (for example, microbes, scales, and oil) in concentrated water, or fouling by adding a dummy membrane or a fouling evaluation unit and then changing the direction when the measurements are higher than a set value can be employed. Obviously, the measurements vary depending on the conditions (such as concentration, temperature, and pH) of the stream-to-be-treated, and thus it is preferred to calibrate the measurements such as the pressure loss, as needed. Especially, it is preferred to measure pressure loss calculated from the differential between the pressure of a feed stream and the pressure of a concentrate stream in a single separation membrane unit component, pressure loss calculated from the differential between the pressure of a stream-to-be-treated first fed and the pressure of a concentrate stream discharged from the last portion in a subunit that includes a plurality of separation membrane unit components disposed in series, or pressure loss calculated from pressure differential in part of a plurality of subunits, and then to change the feed direction of said stream-to-be-treated based on a change in the measurements. Particularly, pressure loss due to fouling is more likely to occur in the first and last subunits, and thus it is especially preferred to measure such pressure loss alone or in combination.

In an embodiment of the present invention, the inlet for a stream-to-be-treated of the separation membrane module 47 is switched between the reference numerals 38 and 40, as illustrated in FIG. 2, and thus the stream-to-be-treated sealing material is required to have a structure that can reverse the flow direction of a stream-to-be-treated without problems. In general, a stream-to-be-treated is fed in a single direction, and thus U-coupling seals or V-coupling seals have been devised and widely used as a sealing material. The U-coupling seals use elastomeric resin and are installed in an anti-telescoping plate of a separation membrane element, with their open portion of the U-shape oriented toward the side at which a stream-to-be-treated is fed (raw water side). Such U-cup seals are configured so that their open portion expands due to water pressure when water is fed at the raw water side to seal the gap between the U-cup seal and a pressure vessel. The V-coupling seals have the similar configuration.

Figure 14:
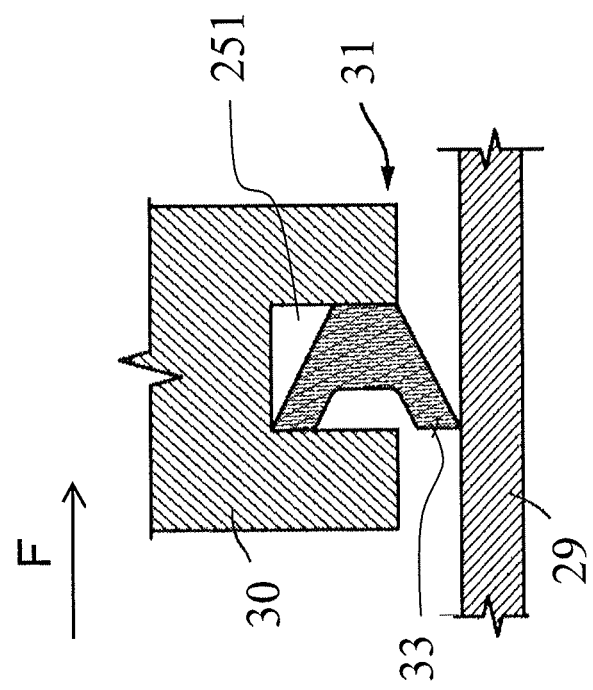
FIG. 14 is a partial enlarged cross-sectional view of the area near the section of a U-cup seal installed in an anti-telescoping plate of a separation membrane element disposed in a pressure vessel.

FIG. 14 is a schematic enlarged cross-sectional view of the area near the installed section of a U-cup seal when a separation membrane element is disposed in a pressure vessel and the U-cup seal 33 sits in an annular groove 251 in a perimeter 30 of the anti-telescoping plate to form a seal between the perimeter of the anti-telescoping plate and an inner wall of the pressure vessel.

In FIG. 14, although the U-cup seal 33 has a relatively small contact area with an inner wall 29 of the pressure vessel, the seal 33 forms a seal against water that flows from the upstream to the downstream of a stream-to-be-treated (raw water) (from the left to the right in FIG. 14 as indicated by an arrow F) as described above. When the separation membrane element is moved within the pressure vessel, the element can be moved with a relatively small resistance by sliding the element from the left to the right in FIG. 14. However, it is difficult to move the separation membrane element from the right to the left. In the present invention, a stream-to-be-treated is preferably capable of being fed at either side, and thus the U-cup seals and V-cup seals are not suitable.

Figure 15:
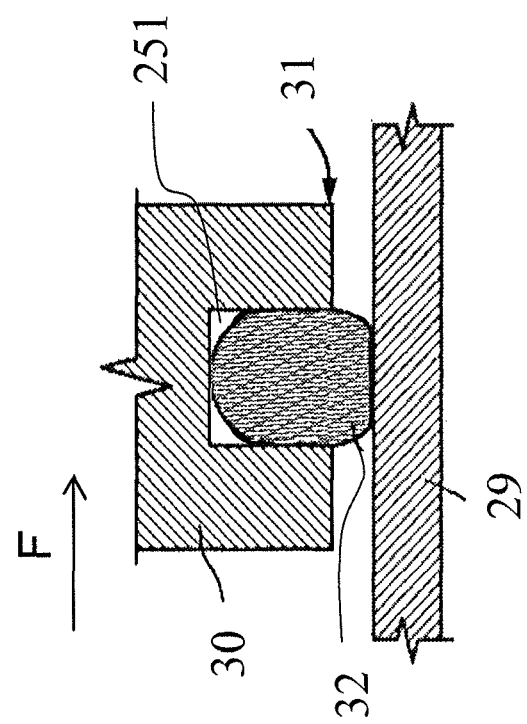
FIG. 15 is a schematic partial enlarged cross-sectional view of the area near the section of an O-ring seal installed in an anti-telescoping plate of a separation membrane element disposed in a pressure vessel.

On the other hand, an O-ring seal of a conventional art may be used. The O-ring seal that sits in an annular groove in a perimeter of an anti-telescoping plate is contacted with an inner wall of a pressure vessel, and then crushes and deforms, thereby sealing the gap between the separation membrane element and the pressure vessel. Thus the O-ring seal can form a good seal against a stream-to-be-treated fed at either side. FIG. 15 is a schematic partial enlarged cross-sectional view of the area near the installed section of an O-ring seal when a separation membrane element is disposed in a pressure vessel and the O-ring seal 32 sits in an annular groove 251 in a perimeter 30 of an anti-telescoping plate 25 to form a seal between the perimeter of the anti-telescoping plate and the inner wall of the pressure vessel.

In FIG. 15, the O-ring seal 32 deforms in the region in which the seal 32 is pressed against the inner wall 29 of the pressure vessel, and thus has a larger contact area with the inner wall 29 of the pressure vessel. Furthermore, because the O-ring seal 32 is made from elastomeric resin, the seal 32 has strong sliding friction with the inner wall 29 of the pressure vessel, and thus have a drawback in that the separation membrane element is difficult to move within the pressure vessel.

Figure 16:
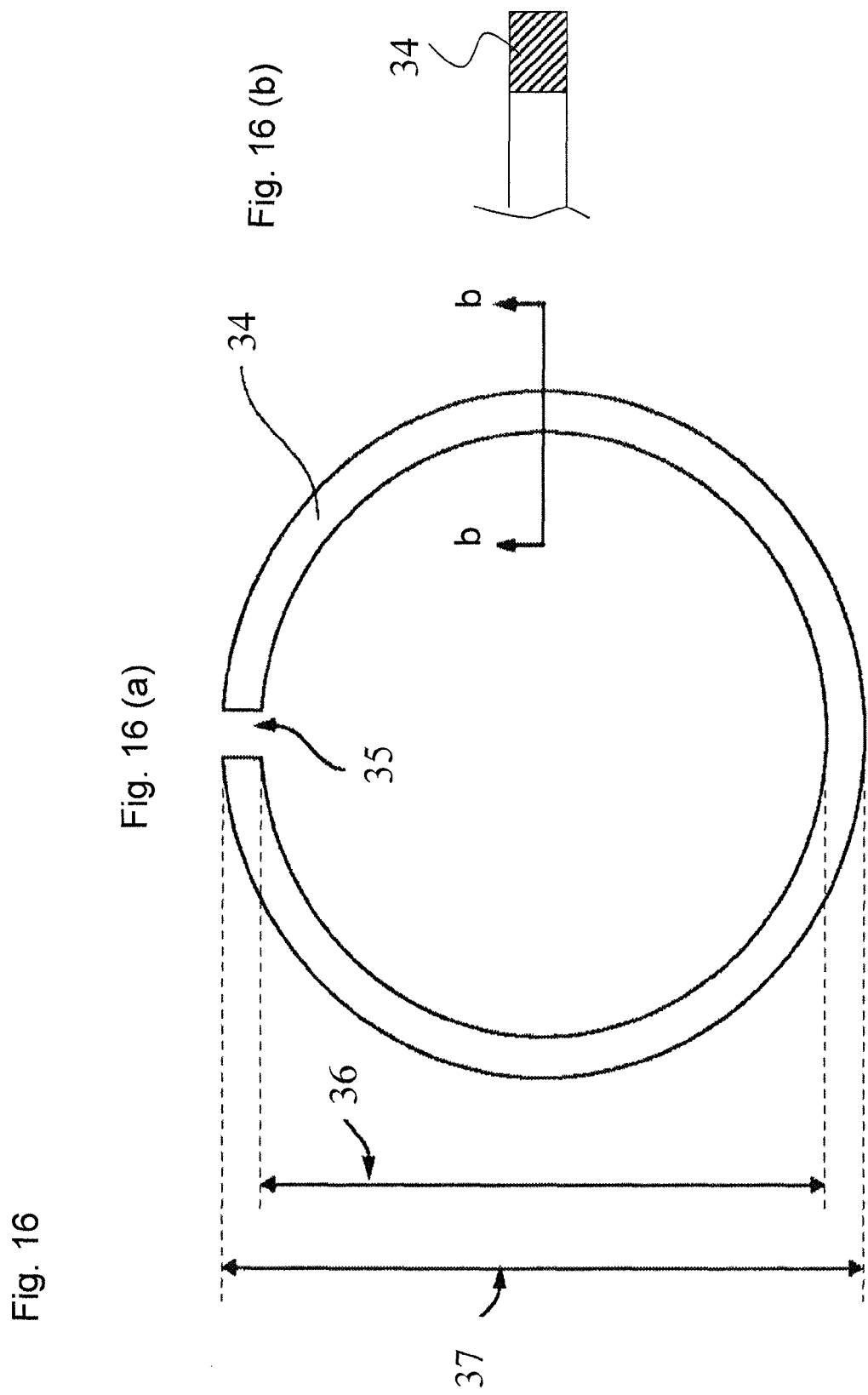
FIGS. 16 (a) and (b) are a schematic illustrative view of an example of a sealing material in the form of a split ring.

To overcome the drawbacks of the O-ring seals and the U-cup seals, it is preferred to use, for example, a sealing material in the form of a split ring (hereinafter sometimes referred to as "split ring seal") as illustrated in FIG. 16. The split ring seal 34 is described in WO2011/046944. The split ring seal 34 has a form like an annular seal being cut and split at one or more points. For example, as illustrated in FIG. 16 (a) (plan view), the split ring seal preferably includes a single gap 35, but two semicircular split ring seals that together form an annular seal being cut and split at two points may be used. The transverse cross-sectional shape of the split ring seal may be, without limitation, any structure that can sit in the annular groove 251 in the perimeter 30 of the anti-telescoping plate so that the seal is not moved, including, for example, a substantially rectangular shape as illustrated in FIG. 16 (b) (a cross-sectional view taken along the line b-b in FIG. 16 (a)) and a substantially polygonal shape. The split ring seal is designed to have a length of the external perimeter (perimeter length) so that the outer diameter 37 of an annulus formed by closing the gap 35 in the split ring seal 34 is slightly longer than the diameter of the inner wall of the pressure vessel. Practically, the split ring seal is designed to decrease the gap, thereby obtaining a tight fit between the split ring seal and the inner wall of the pressure vessel, when the ring seal is installed in the anti-telescoping plate of the separation membrane element and the element is disposed in the pressure vessel. The length of the internal perimeter (internal perimeter length) of the split ring seal may be designed so that the inner diameter 36 of an annulus formed by closing the gap 35 in the split ring seal 34 fits in the annular groove 251 in the perimeter 30 of the anti-telescoping plate. Although the size of the split ring seal 34 may be optimized based on the outer diameter of the element and the materials, the seal may have, for example, a radial width (i.e., half of the difference between the outer diameter 37 and the inner diameter 36) of about 5-10 mm, and a seal thickness of about 3-10 mm.

Such split ring seal 34 has a rectangular cross-sectional shape as illustrated in FIG. 16 (b), and thus the sliding surface and the sealing material can be contacted in parallel or symmetrically in either direction, thereby allowing feed of a stream-to-be-treated at either side (38 and 40) of the separation membrane module 47 and allowing easy movement of the separation membrane element within the pressure vessel both when the spiral-wound membrane element is inserted into a cylindrical pressure vessel and when the separation membrane element is removed from the pressure vessel. Particularly, if a plurality of separation membrane unit components are used as illustrated in FIGS. 5-13, insertion of the elements can often be limited depending on the layout, and thus the structure of the present invention is highly preferred, because the structure allows insertion and removal of the elements at either side even if only a single element is disposed in a pressure vessel.

A sealing material applicable to the present invention can have properties capable of forming a sufficient seal against a stream-to-be-treated fed at either side of the separation membrane element. The sealing material that has such properties can have a split ring form as described above, a delta ring form having a pointed seal-contact surface, i.e., having, for example, a triangular cross section, a form having a convex lens cross section rather than an O-cross section, or a corrugated form having a contact surface with ridges and grooves. An O-ring form may also be applied, although such form has a slidability problem. In the case of the O-ring or delta ring form, use of an elastomeric sealing material provides improved sealability, which is thus preferred, but precautions must be taken because such sealing material tends to exhibit reduced slidability. To stress the slidability, it is important to decrease the squeeze (the amount an O-ring or the like made from an elastomeric material is compressed and deformed during use in order to provide closer contact), which is typically considered in a seal material made from an elastomeric material. In particular, if the O-ring has a squeeze of 10% or less and more preferably 5% or less, the squeeze being usually 8-30%, the ring can exhibit good slidability in a pressure vessel, but precautions must be taken in application because good precision is required.

Figure 17:
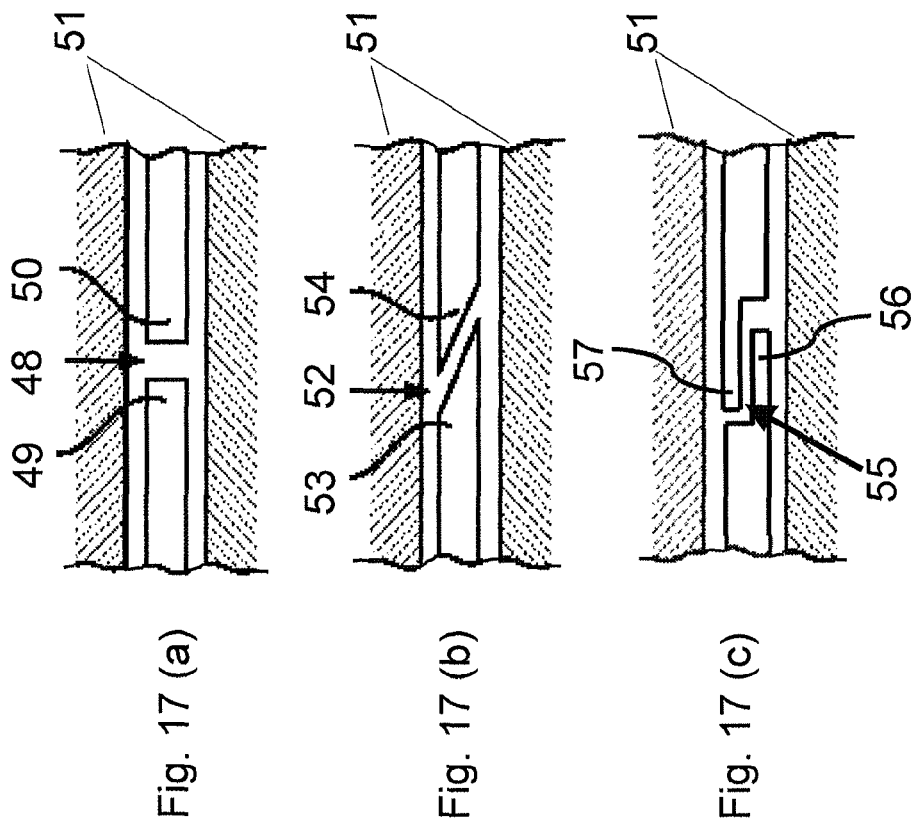
FIGS. 17 (a), (b), and (c) illustrate an example of the configuration of a gap in a sealing material in the form of a split ring.
Figure 18:
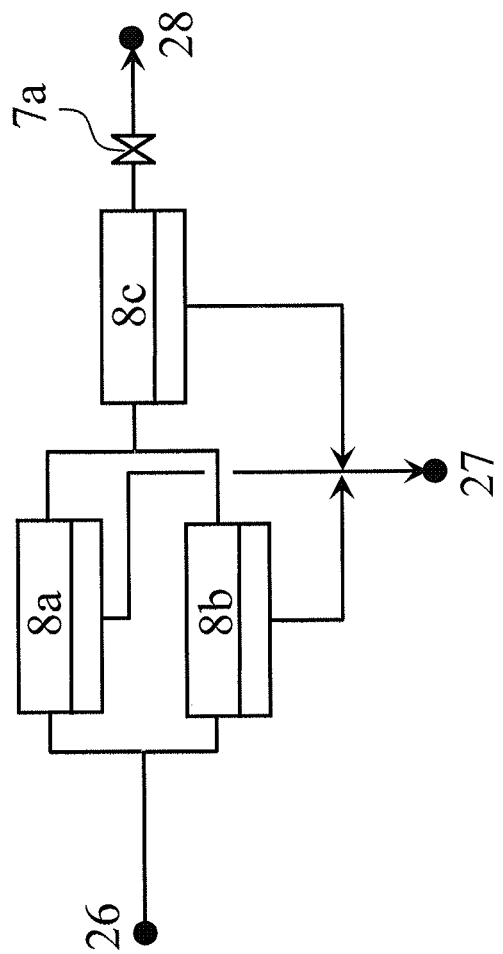
FIG. 18 illustrates an example of the configuration of a separation membrane unit that includes a plurality of subunits organized in a tree structure to reduce the number of later membrane elements.

The form of the gap in the split ring seal is not particularly limited, and by way of examples, as illustrated in FIG. 16, the gap includes a gap disposed perpendicular to a longitudinal direction of a seal (FIG. 17 (a)), a gap disposed at an angle relative to a longitudinal direction of a seal (FIG. 17 (b)), and a gap disposed in a stepped configuration relative to a longitudinal direction of a seal (FIG. 17 (c)).

Especially, if a gap is disposed at an angle relative to a longitudinal direction of a seal (FIG. 17 (b)) or disposed in a stepped configuration to a longitudinal direction of a seal (FIG. 17 (c)), pressure that is generated when a stream-to-be-treated actually flows through the pressure vessel butts the ends of the split ring together to substantially close the gap at the ends of the split ring. As a result, sealing effect is substantially maintained even at the joint between the ends, and very little stream-to-be-treated bypasses out of the separation membrane element, thereby allowing efficient water treatment.

After the split ring seal is installed in the perimeter of the anti-telescoping plate of the separation membrane element, the ends of the seal may be simply contacted, or the ends may be bonded. A method for the bonding may includes thermal fusion bonding, strong bonding by an adhesive, or joining of the ends of the split ring seal by concave-convex mating. The joining of the ends of the split ring by concave-convex mating allows the split ring seal to be prevented from removing due to shock in handling.

When a split ring seal is installed in the perimeter of the anti-telescoping plate, one or more sealing materials may be disposed. If a plurality of sealing materials are disposed, it is preferred to dispose the gaps in different positions, thereby allowing further reduce the amount of raw water that flows out of the separation membrane element.

A material that constitutes the split ring may be non-elastomeric or elastomeric, and it is preferred to use a non-elastomeric material. Organic materials that can be used include various rigid plastics such as polytetrafluoroethylene, polyvinylidene fluoride, polyethylene, and polypropylene. Inorganic materials that can be used include iron, stainless steel, copper, aluminum, and titanium, and alloys thereof, as well as ceramic, graphite, and asbestos. And organic-inorganic composites such as FRP and multilayer stacks of the materials described above can also be used.

The elastomeric material is not particularly limited, and a seal material that is widely used can be employed, including nitrile rubber, styrene-butadiene rubber, silicone rubber, fluororubber, acrylic rubber, ethylene-propylene rubber, and urethane rubber.

Note that these materials preferably have resistance to a stream-to-be-treated for which the separation membrane module 47 is intended. For example, if the module is intended for seawater, a seal made from an iron alloy tends to corrode, while the stream-to-be-treated contains an organic solvent, a seal made from resin with poor durability tends to degrade, and thus precautions must be taken.

Thus, when the present invention is applied, the object of the present invention can be achieved by using a sealing material as illustrated in FIGS. 16 and 17, especially a sealing material in the form of a split ring, as each of the stream-to-be-treated sealing materials (45a1-45f1 and 45a2-45f2 in FIG. 2). And, if a U-cup seal ring or a V-cup seal ring is additionally used when the flow direction is reversed, the separation membrane element is moved only in a single direction, but a more secure seal can be provided, which is a preferred embodiment.

The separation membrane 21 used for a spiral-wound membrane element to which the present invention is applicable is a flat-sheet separation membrane, and a reverse osmosis membrane, a ultrafiltration membrane, a microfiltration membrane, a gas separation membrane, a degassing membrane, and the like can be used. For the feed side channel spacer 23, a net material, a mesh material, a grooved sheet, a corrugated sheet, and the like can be used. For the permeate side channel spacer 22, a net material, a mesh material, a grooved sheet, a corrugated sheet, and the like can be used. Both of the spacers may be a net or sheet that is independent of the separation membrane, or integrated into the membrane by adhesive bonding, fusion bonding, or the like.

The anti-telescoping plate 25 is a plate that is attached in order to prevent the wound laminates of the separation membranes from being deformed into a cylindrical shape due to pressure of the passing stream (telescoping), and that has holes. Preferably, the plate 25 has, at the outer side, the annular groove 251 into which a sealing material is fit. The anti-telescoping plate 25 may have any material quality, as long as the plate has a function to prevent the deformation. However, if chemical resistance, thermal resistance, and/or the like are required depending on the application, the material quality can be selected as desired to meet the required specification. In general, resin materials such as thermoplastic resin, thermosetting resin, and thermally stable resin materials are suitable. And the anti-telescoping plate 25 preferably has a spoke configuration that includes an external annular portion, an inner annular portion, and a radial spoke portion, in order to maintain the strength, preferably without interfering with flow of raw water.

The center tube 24 has a plurality of holes in a side of the tube. Although the center tube 24 may be made from any material such as resin and metal, plastics such as NORYL resin and ABS resin are generally used, in view of cost and durability.

Suitably, adhesive bonding is used to seal edges of the separation membrane 21. Any known adhesives can be used, including urethane adhesives, epoxy adhesives, hot-melt adhesives, and the like.

Preferably, the spiral-wound membrane element is configured so that the outer surface of the wound laminates is constrained by a cladding to prevent increase in the diameter. The cladding is made from a sheet of polyester, polypropylene, polyethylene, polyvinyl chloride, or the like, glass fibers coated with curable resin, or the like. The outer surface of the wound laminates is surrounded and constrained by such sheet or fibers to prevent increase in the diameter of the separation membrane element.

Although the stream-to-be-treated to which the present invention is applicable includes, but not limited to, various stream-to-be-treated such as river water, seawater, sewage treatment water, rainwater, industrial water, industrial wastewater, and the like, the present invention is suitable for a stream-to-be-treated that contains various organic and inorganic materials.

The present invention provides a separation membrane unit component having a structure that can produce membrane separation performance both when a stream-to-be-treated is fed at the stream-to-be-treated (feed water) side and when a stream-to-be-treated is fed at the concentrate stream (concentrated water) side, thereby allowing the use of separation membranes to be balanced and allowing effective prevention of fouling while maintaining a high operation rate.

DESCRIPTION OF THE REFERENCE NUMERAL

1: raw water
2: raw water tank
3: raw water feed pump
4: pretreatment unit
5: pretreated water tank
6: pressure pump
7: valve
8: separation membrane unit component
9: concentrated water line in second stage
10: product water tank
11: energy recovery unit
12: water discharge line
13: three-way valve
20: separation membrane element
21: separation membrane
22: permeate side channel spacer
23: feed side channel spacer
24: center tube
25: anti-telescoping plate
251: annular groove
26, 26a: stream-to-be-treated (raw water)
27, 27a: permeate stream (permeate water)
28: concentrate stream (concentrated water)
29: inner wall of cylindrical pressure vessel
30: perimeter of anti-telescoping plate
31: outer peripheral surface of anti-telescoping plate
32: O-ring seal
33: U-cup seal
34: sealing material in the form of a split ring
35: gap in sealing material in the form of a split ring
36: inner diameter of sealing material in the form of a split ring
37: outer diameter of sealing material in the form of a split ring
38: stream-to-be-treated (raw water) inlet
39a, 39b, 39c, 39d, 39e, 39f: separation membrane element
40: concentrate stream (concentrated water) outlet
41: connector
42a, 42b: end plate
43a, 43b: permeate stream (permeate water) outlet
44: pressure vessel body
45a1, 45b1, 45c1, 45d1, 45e1, 45f1: sealing material
45a2, 45b2, 45c2, 45d2, 45e2, 45f2: sealing material
46: cylindrical pressure vessel
47: separation membrane module
48: square gap
49, 50: sealing material adjacent to square gap
51: end of circumferential groove in anti-telescoping plate
52: angled gap
53, 54: sealing material adjacent to angled gap
55: step gap
56, 57: sealing material adjacent to step gap

The invention claimed is:

1. A membrane separation device comprising:
a unit for feeding a stream-to-be-treated; and a separation membrane unit that comprises a plurality of separation membrane unit components;
wherein each of the plurality of separation membrane unit components comprises at least one separation membrane module;
wherein each of the at least one separation membrane module comprises one or more separation membrane elements disposed in a cylindrical pressure vessel;
a feed stream side line F1, a feed stream side line F2, and a permeate stream line P are connected to the plurality of separation membrane unit components;

wherein a stream-to-be-treated feed is separated by separation membranes in the one or more separation membrane elements into a permeate stream and a concentrate stream;

wherein in the one or more separation membrane elements, a cladding is wrapped around an outer surface of a wound laminate formed by winding the separation membranes together with a channel spacer, and an anti-telescoping plate is attached to at least one end of the wound laminate and the cladding;

wherein a sealing material is disposed on a perimeter of at least one of the anti-telescoping plate and an inner wall of the cylindrical pressure vessel to allow movement of the one or more separation membrane elements substantially in either direction within the cylindrical pressure vessel;

wherein when the stream-to-be-treated is fed to the plurality of separation membrane unit components through one of the feed stream side lines F1 and F2, the separation membrane unit is configured to discharge the concentrate stream from the other of the feed stream side lines F1 and F2; and wherein the separation membrane unit comprises a mechanism that can change a flow direction of the stream-to-be-treated so that the stream-to-be-treated is fed to the plurality of separation membrane unit components through either of the feed stream side lines F1 and F2; and wherein when one or more of the plurality of separation membrane unit components that first treat the stream-to-be treated are referred to as a subunit (A), the one or more of the plurality separation membrane unit components of the subunit (A) is configured to feed the concentrate stream discharged from the subunit (A) to a subunit (B), wherein the subunit (B) is constituted by one or more of the plurality of separation membrane unit components other than the one or more of the plurality of separation membrane unit components of the subunit (A), and to feed the concentrate stream discharged from the subunit (B) to the subunit (A) by changing the flow direction of the stream-to-be-treated;

wherein the separation membrane unit comprises feed stream side lines F3 and F4, and a subunit (D) comprising one or more of the plurality of separation membrane unit components, wherein the permeate stream discharged from the at least one of the plurality of separation membrane unit components of the subunit (A) or the subunit (B) is fed to the subunit (D);

wherein the permeate stream separated by the subunit (D) is discharged into the permeate stream line P and the concentrate stream exits the membrane separation device;

wherein the separation membrane unit is configured so that when the permeate stream of the subunit (A) or the subunit (B) is fed to the subunit (D) through one of the feed stream lines F3 and F4, the concentrate stream of the subunit (D) is discharged from the subunit (D) through the other of the feed stream lines F3 and F4; and wherein the separation membrane unit includes a mechanism that can switch the flow so that the permeate stream of the subunit (A) or subunit (B) is fed to the subunit (D) through either of the feed stream side lines F3 and F4.

2. The membrane separation device according to claim 1, wherein three-way valves are used to switch the flow of the stream-to-be-treated to the plurality of separation membrane unit components, between the feed stream side line F1 and the feed stream side line F2.

3. The membrane separation device according claim 1, wherein when the total membrane area of each of the subunits (A) and (B) is taken as Sa and Sb respectively, the separation membrane unit components of the subunits (A) and (B) are arranged such that the relationship of Sa>Sb is obtained.

4. The membrane separation device according to claim 1, wherein the separation membrane unit comprises at least three of the separation membrane unit components; and wherein when one or more of the at least three separation membrane unit components that first treat the stream-to-be-treated are referred to as the subunit (A) and one or more of the plurality of separation membrane unit components other than the one or more of the separation unit components of the subunit (A) constitutes the subunit (B), the separation membrane unit is configured to feed the concentrate stream discharged from the subunit (A) to the subunit (B), and to further feed the concentrate stream discharged from the subunit (B) to a subunit (C) constituted by one or more of the at least three separation membrane unit components other than the separation membrane unit components of the subunits (A) and (B).

5. The membrane separation device according to claim 4, wherein when the total membrane area of each of the subunits (A), (B), and (C) is taken as Sa, Sb, and Sc respectively, the separation membrane unit components of the subunits (A), (B) and (C) are arranged such that the relationship of Sa>Sb≥Sc is obtained.

6. A method for operating the membrane separation device according to claim 1, wherein the stream-to-be-treated is fed to the plurality of separation membrane unit components through the feed stream side lines F1 and F2 in a direction from the feed stream side line F1 to the feed stream side line F2 or in a direction from the feed stream side line F2 to the feed stream side line F1 for treatment.

7. The method for operating the membrane separation device according to claim 6, wherein the method comprises measuring a pressure loss calculated from a differential pressure between a pressure of a feed stream and a pressure of a concentrate stream in a single separation membrane unit component of the plurality of separation membrane unit components, or a pressure loss calculated from a differential pressure between a pressure of a feed stream and a pressure of a concentrate stream in a subunit that comprises a plurality of the separation membrane unit components disposed in series; and changing the feed direction of the stream-to-be-treated based on a change in the pressure loss measurements.

* * * * *